United States Patent
Baratam et al.

(10) Patent No.: US 9,686,736 B2
(45) Date of Patent: Jun. 20, 2017

(54) METHOD TO IMPROVE PUBLIC LAND MOBILE NETWORK SEARCH

(71) Applicant: QUALCOMM Incorporated, San Diego, CA (US)

(72) Inventors: Chaitanya Baratam, Hyderabad (IN); Sivasubramanian Ramalingam, Hyderabad (IN); Vikas Gulati, Hyderabad (IN); Girish Valluru, Hyderabad (IN); Sathish Krishnamoorthy, Hyderabad (IN); Satish Pavan Kumar Nichanametla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 14/323,153

(22) Filed: Jul. 3, 2014

(65) Prior Publication Data
US 2015/0208327 A1 Jul. 23, 2015

Related U.S. Application Data

(60) Provisional application No. 61/928,567, filed on Jan. 17, 2014, provisional application No. 61/928,721, filed on Jan. 17, 2014.

(51) Int. Cl.
*H04W 48/16* (2009.01)
*H04W 68/00* (2009.01)

(52) U.S. Cl.
CPC ........... *H04W 48/16* (2013.01); *H04W 68/00* (2013.01)

(58) Field of Classification Search
CPC .............................. H04W 48/16; H04W 68/00
See application file for complete search history.

(56) References Cited

U.S. PATENT DOCUMENTS

2008/0057948 A1* 3/2008 Mittal ............... H04W 48/16
455/426.1
2009/0182871 A1 7/2009 Gupta et al.
(Continued)

OTHER PUBLICATIONS

Huawei Technologies Co et al., "Reading MIB/SIB for inbound mobility to CSG", 3GPP Draft; AHG1-090010 Reading Si for Inbound Mobility to CSG, 3rd Generation Partnership Project (3GPP), Mobile Competence Centre; 650, Route Des Lucioles; F-06921 Sophia-Antipolis Cedex; France, vol. TSG GERAN, No. Sophia Antipolis, France; Oct. 19, 2009, Oct. 14, 2009 (Oct. 14, 2009), XP050412566, [retrieved on Oct. 14, 2009].
(Continued)

*Primary Examiner* — Joseph Dean, Jr.
(74) *Attorney, Agent, or Firm* — Ashish L. Patel

(57) ABSTRACT

In various aspects, the disclosure provides user equipment (UE) capable of conducting a public land mobile network (PLMN) search by determining a paging schedule for a serving cell of the UE, the serving cell being associated with a first PLMN and the paging schedule defining one or more paging occasions. The UE may initiate a search for a second PLMN between consecutive paging occasions, and may read information blocks on a broadcast channel of a cell of the second PLMN. The UE may discontinue reading a partially-read information block when the partially-read information block is scheduled for transmission at least partially concurrently with a paging occasion on the serving cell if the partially-read information block does not include information for identifying the second PLMN. The UE may ignore the first paging occasion when the partially-read information block includes the information for identifying the second PLMN.

30 Claims, 14 Drawing Sheets

(56) References Cited

U.S. PATENT DOCUMENTS

| | | |
|---|---|---|
| 2011/0159880 A1 | 6/2011 | Kumar et al. |
| 2012/0163235 A1 | 6/2012 | Ho et al. |
| 2012/0294173 A1 | 11/2012 | Su et al. |
| 2013/0064119 A1 | 3/2013 | Montojo et al. |
| 2013/0083753 A1 | 4/2013 | Lee et al. |
| 2013/0114566 A1 | 5/2013 | Awoniyi et al. |
| 2013/0208673 A1 | 8/2013 | Petermann et al. |
| 2013/0303203 A1* | 11/2013 | Wang .................. H04W 68/00 455/458 |
| 2013/0303240 A1 | 11/2013 | Sanka et al. |
| 2013/0308497 A1 | 11/2013 | Novak et al. |
| 2013/0337809 A1 | 12/2013 | Gude et al. |
| 2014/0056220 A1 | 2/2014 | Poitau et al. |
| 2014/0066055 A1 | 3/2014 | Balakrishnan et al. |
| 2014/0066061 A1 | 3/2014 | Lou et al. |

OTHER PUBLICATIONS

International Search Report and Written Opinion—PCT/US2015/011401—ISA/EPO—Apr. 22, 2015.

* cited by examiner

METHOD TO IMPROVE PUBLIC LAND MOBILE NETWORK SEARCH

CROSS-REFERENCE TO RELATED APPLICATIONS

This application claims priority to and the benefit of U.S. provisional patent application No. 61/928,567 filed on Jan. 17, 2014, and U.S. provisional patent application No. 61/928,721 filed on Jan. 17, 2014, the entire content of both applications being incorporated herein by reference.

TECHNICAL FIELD

Aspects of the present disclosure relate generally to wireless communication systems, and more particularly, to systems and methods for searching for a public land mobile network in a wireless communication system.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

A wireless device may be associated with a public land mobile network (PLMN) and may be configured to prefer an association with a home PLMN (HPLMN) that holds or maintains a profile of the subscriber associated with the wireless device. When the wireless device is unable to communicate with the HPLMN, the wireless device may be said to be roaming and may connect to a visited PLMN (VPLMN). The wireless device may also enter an out of service (OOS) mode if neither a HPLMN nor a VPLMN is available. While roaming or OOS, the wireless device may periodically perform a search for the HPLMN.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The disclosure describes systems, apparatus and methods that may be adapted to perform efficient PLMN searches. In this regard, user equipment (UE) may be adapted or configured to determine a transmission schedule for system information, which may include a paging schedule or a discontinuous reception (DRX) schedule for a current serving cell. The UE may be adapted or configured to initiate a PLMN search for a preferred PLMN or HPLMN between DRX paging intervals, and determine whether to receive a page on a serving cell or to continue reading a partially-read system information block (SIB) on the broadcast channel of a second cell during the PLMN search based on the nature of the content of the partially-read SIB. The disclosure also provides a UE configured to conduct a search between certain information blocks broadcast on a first cell, whereby the UE may acquire a second cell and reacquire the first cell before a required information block is scheduled for transmission on the first cell.

In various aspects, the disclosure provides methods for conducting a PLMN search, in which a UE determines a paging schedule for a serving cell of the UE, the serving cell being associated with a first PLMN and the paging schedule defining one or more paging occasions. The UE may initiate a search for a second PLMN between consecutive paging occasions, read a MIB on a broadcast channel of a cell of the second PLMN, and read at least a portion of a SIB on the broadcast channel of the cell of the second PLMN based on scheduling information provided in the MIB. The UE may discontinue reading of a partially-read SIB when the partially-read SIB is scheduled for transmission at least partially concurrently with a first paging occasion of the one or more paging occasions and the partially-read SIB does not include information for identifying the second PLMN. The UE may ignore the first paging occasion when the partially-read SIB is scheduled for transmission at least partially concurrently with the first paging occasion and the partially-read SIB includes the information for identifying the second PLMN. For example, the partially-read SIB may include a SIB-1 or a SIB-3, which can include information for identifying the second PLMN.

In an aspect of the disclosure, the first PLMN is a visited PLMN. The paging schedule may be determined by receiving system information while the user equipment is camped on the serving cell. The search for the second PLMN may be initiated to find a home PLMN.

In an aspect of the disclosure, discontinuing reading of the partially-read SIB includes storing, in a storage medium, at least one of the MIB or one or more SIBs received from the broadcast channel of the cell of the second PLMN. Discontinuing reading of the partially-read SIB may include receiving a page from the serving cell based on the first paging occasion and on the storing in the storage medium. The UE may retrieve the at least one of the MIB or the one or more SIBs from the storage medium after receiving the page, and may read the partially-read SIB on the broadcast channel of the cell of the second PLMN after retrieving the at least one of the MIB or the one or more SIBs from the storage medium.

In an aspect of the disclosure, the UE stores in a storage medium the MIB received from the broadcast channel of the cell of the second PLMN when the reading of the partially-read SIB is discontinued The UE may receive a page from the serving cell based on the first paging occasion and on the storing in the storage medium. The UE may retrieve the MIB from the storage medium after receiving the page, and may read the partially-read SIB on the broadcast channel of the cell of the second PLMN after retrieving the MIB.

In an aspect of the disclosure, the information for identifying the second PLMN includes one or more of a mobile country code, a mobile network code, or information identifying a service provider associated with the second PLMN.

In various aspects, the disclosure provides a UE configured for wireless communication, having at least one processor, a memory coupled to the at least one processor, and a wireless communication interface coupled to the at least one processor. The at least one processor may be configured to determine a paging schedule for a serving cell of the user equipment, where the serving cell is associated with a first PLMN, and where the paging schedule defines one or more paging occasions. The at least one processor may also be configured to initiate a search for a second PLMN between consecutive paging occasions. The at least one processor may be configured to read a MIB on a broadcast channel of a cell of the second PLMN, and read at least a portion of a SIB on the broadcast channel of the cell of the second PLMN based on scheduling information provided in the MIB. The at least one processor may be configured to discontinue reading of the partially-read SIB when the partially-read SIB is scheduled for transmission at least partially concurrently with a first paging occasion of the one or more paging occasions and the partially-read SIB does not include information for identifying the second PLMN. The at least one processor may be configured to ignore the first paging occasion when the partially-read SIB is scheduled for transmission at least partially concurrently with the paging occasion and the partially-read SIB includes the information for identifying the second PLMN.

In various aspects, the disclosure provides an apparatus for wireless communication. The apparatus may include means for determining a paging schedule for a serving cell of the user equipment, where the serving cell is associated with a first PLMN. The paging schedule may define one or more paging occasions. The apparatus may include means for initiating a search for a second PLMN between consecutive paging occasions. The apparatus may include means for reading a MIB on a broadcast channel of a cell of the second PLMN and for reading at least one SIB on the broadcast channel of the cell of the second PLMN based on scheduling information provided in the MIB. The apparatus may include means for identifying whether a partially-read SIB includes information for identifying the second PLMN. The apparatus may include means for determining whether to discontinue reading of the partially-read SIB in order to receive a page. Reading of the partially-read SIB may be discontinued when the partially-read SIB is scheduled for transmission at least partially concurrently with a first paging occasion of the one or more paging occasions and the partially-read SIB does not include the information for identifying the second PLMN. The first paging occasion may be ignored when the partially-read SIB is scheduled for transmission at least partially concurrently with the paging occasion and the partially-read SIB includes the information for identifying the second PLMN.

In various aspects, the disclosure provides a computer-readable storage medium having code for determining a paging schedule for a serving cell of a UE, where the serving cell is associated with a first PLMN and the paging schedule defines one or more paging occasions. In some aspects, the computer-readable storage medium also includes code for initiating a search for a second PLMN between consecutive paging occasions. In some aspects, the computer-readable storage medium also includes code for reading a MIB on a broadcast channel of a cell of the second PLMN. In some aspects, the computer-readable storage medium also includes code for reading, by the UE, at least a portion of a SIB on the broadcast channel of the cell of the second PLMN based on scheduling information provided in the MIB. In some aspects, the computer-readable storage medium also includes code for discontinuing reading of a partially-read SIB when the partially-read SIB is scheduled for transmission at least partially concurrently with a first paging occasion of the one or more paging occasions and the partially-read SIB does not include information for identifying the second PLMN. In some aspects, the computer-readable storage medium also includes code for ignoring the first paging occasion when the partially-read SIB is scheduled for transmission at least partially concurrently with the first paging occasion and the partially-read SIB includes the information for identifying the second PLMN.

In various aspects, the disclosure provides a method of conducting a PLMN search by a UE, which includes receiving a first information block on a broadcast channel of a first cell associated with the UE, and determining whether a time interval before a second information block is to be broadcast on the first cell exceeds a threshold period of time. When the time interval exceeds the threshold period of time, the method includes acquiring a second cell before the second information block is broadcast on the first cell, and reacquiring the broadcast channel of the first cell before the second information block is broadcast on the first cell based on the acquiring the second cell. The method further includes receiving the second information block from the broadcast channel of the first cell. The second information block is received after determining the time interval.

In an aspect of the disclosure, the UE may store system information corresponding to the second cell after acquiring the second cell. The system information may include acquisition information of the second cell. The acquisition information of the second cell may be used by the UE to reacquire the second cell the after receiving the second information block from the broadcast channel of the first cell. In one example, the UE may reacquire the broadcast channel of the first cell using previously obtained acquisition information of the first cell.

In an aspect of the disclosure, the UE may receive an information block from the second cell before receiving the second information block from the first cell. The second information block may include information for identifying a PLMN associated with the first cell.

In an aspect of the disclosure, the UE may be configured to set a timer based on the time interval when the time interval exceeds the threshold period of time, and reacquire the broadcast channel of the first cell when the timer expires. The threshold period of time may include a length of time calculated as a sum of a first acquisition time and a second acquisition time, the first acquisition time corresponding to a time to reacquire the first cell and the second acquisition time corresponding to a time to acquire the second cell. In some instances, the time to acquire the second cell may correspond to a time to reacquire the second cell.

In various aspects, the disclosure provides a UE having means for receiving information blocks on a broadcast channel of a first cell associated with the UE, means for determining whether a time interval before a second information block is to be broadcast on the first cell after a first information block is received exceeds a threshold period of time, and means for acquiring first and second cells. The means for acquiring the first and second cells may be configured to acquire a second cell when the time interval exceeds the threshold period of time before the second information block is to be broadcast on the first cell, and reacquire the broadcast channel of the first cell before the second information block is broadcast on the first cell based on the acquiring the second cell. The means for receiving information blocks on the broadcast channel of the first cell may be configured to receive the second information block from the broadcast channel of the first cell after the broadcast channel of the first cell is reacquired.

In various aspects, the disclosure provides a UE configured for wireless communication, having at least one processor, a memory coupled to the at least one processor, and a wireless communication interface coupled to the at least one processor. The at least one processor may be configured to receive a first information block on a broadcast channel of a first cell associated with the UE, determine whether a time interval before a second information block is to be broadcast on the first cell exceeds a threshold period of time, acquire a second cell before the second information block is broadcast on the first cell when the time interval exceeds the threshold period of time and, after the second cell has been acquired, reacquire the broadcast channel of the first cell before the second information block is broadcast on the first cell. The second information block may be received from the broadcast channel of the first cell after the broadcast channel of the first cell has been reacquired.

In various aspects, the disclosure provides a computer-readable storage medium having code for receiving, by a UE, a first information block on a broadcast channel of a first cell associated with the UE, determining whether a time interval before a second information block is to be broadcast on the first cell exceeds a threshold period of time. The computer-readable storage medium may have code for acquiring a second cell before the second information block is broadcast on the first cell when the time interval exceeds the threshold period of time, reacquiring the broadcast channel of the first cell before the second information block is broadcast on the first cell based on the acquiring the second cell, and receiving the second information block from the broadcast channel of the first cell after the broadcast channel of the first cell has been reacquired.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

A UE adapted or configured according to certain aspects disclosed herein may be capable of selectively ignoring a page on a serving PLMN while searching for a different PLMN, and/or discontinuing reading of certain SIBs broadcast by the different PLMN in order to receive a page scheduled for transmission by the serving cell. According to an aspect disclosed herein, the UE may improve a PLMN search by performing other useful actions between receipt of information blocks, including performing acquisition of a second cell on another frequency between receipt of information blocks on the serving cell, for example.

Figure 1:
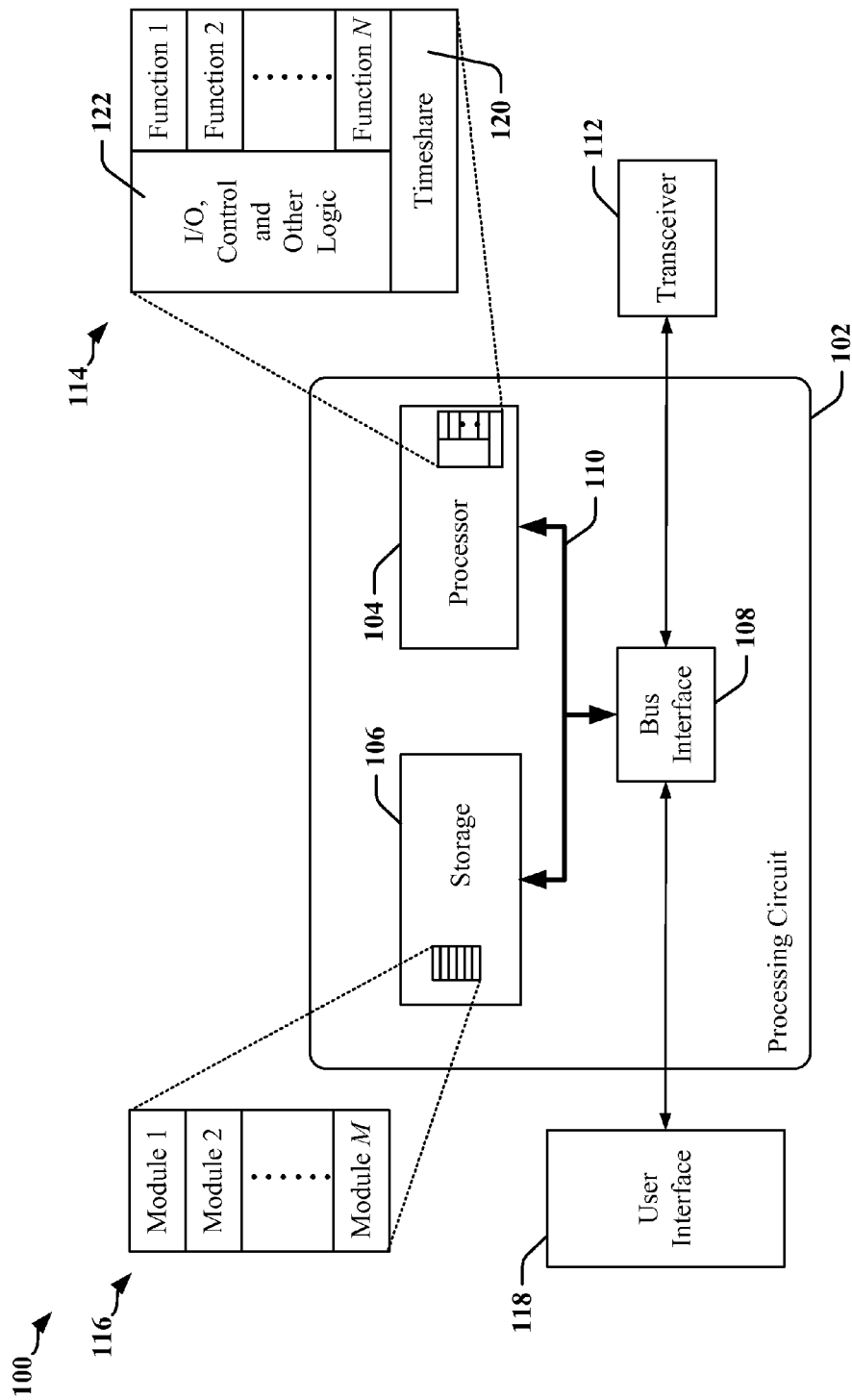
FIG. 1 is a block diagram illustrating an example of an apparatus employing a processing system that may be adapted according to certain aspects disclosed herein.

FIG. 1 is a conceptual diagram 100 illustrating a simplified example of a hardware implementation for an apparatus employing a processing circuit 102 that may be configured to perform one or more functions disclosed herein. In accordance with various aspects of the disclosure, an element, or any portion of an element, or any combination of elements as disclosed herein for searching for public land mobile networks may be implemented using the processing circuit 102. The processing circuit 102 may include one or more processors 104 that are controlled by some combination of hardware and software modules. Examples of processors 104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 104 may include specialized processors that perform specific functions, and that may be configured, augmented or controlled by one of the software modules 116. For example, the processing circuit may be configured as a channel processor, frame processor, or other processor that is adapted to handle encoding and decoding of data for transmission on one or more wireless networks. The one or more processors 104 may be configured through a combination of software modules 116 loaded during initialization, and further configured by loading or unloading one or more software modules 116 during operation.

In the illustrated example, the processing circuit 102 may be implemented with a bus architecture, represented generally by the bus 110. The bus 110 may include any number of interconnecting buses and bridges depending on the specific application of the processing circuit 102 and the overall design constraints. The bus 110 links together various circuits including the one or more processors 104, and storage 106. Storage 106 may include memory devices and mass storage devices, and may be referred to herein as computer-readable media. The bus 110 may also link various other circuits such as timing sources, timers, peripherals, voltage regulators, and power management circuits. A bus interface 108 may provide an interface between the bus 110 and a transceiver 112. The transceiver 112 provides a means for communicating with various other apparatus over a transmission medium. Depending upon the nature of the apparatus, a user interface 118 (e.g., keypad, display, speaker, microphone, joystick) may also be provided, and may be communicatively coupled to the bus 110 directly or through a bus interface 108.

A processor 104 may be responsible for managing the bus 110 and for general processing that may include the execution of software stored in a computer-readable medium that may include the storage 106. In this respect, the processing circuit 102, including the processor 104, may be used to implement any of the methods, functions and techniques disclosed herein. The storage 106 may be used for storing data that is manipulated by the processor 104 when executing software, and the software may be configured to implement any one of the methods disclosed herein, such as those illustrated in regard to FIGS. 7-10 and 13-14.

One or more processors 104 in the processing circuit 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 106 or in an external computer readable medium. The computer-readable medium and/or storage 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 106 may also include, by way of example, a carrier wave, a transmission line, and any other suitable medium for transmitting software and/or instructions that may be accessed and read by a computer. Computer-readable medium and/or the storage 106 may reside in the processing circuit 102, in the processor 104, external to the processing circuit 102, or be distributed across multiple entities including the processing circuit 102. The computer-readable medium and/or storage 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 106 may maintain software maintained and/or organized in loadable code segments, modules, applications, programs, etc., which may be referred to herein as software modules 116. Each of the software modules 116 may include instructions and data that, when installed or loaded on the processing circuit 102 and executed by the one or more processors 104, contribute to a run-time image 114 that controls the operation of the one or more processors 104. When executed, certain instructions may cause the processing circuit 102 to perform functions in accordance with certain methods, algorithms and processes described herein.

Some of the software modules 116 may be loaded during initialization of the processing circuit 102, and these software modules 116 may configure the processing circuit 102 to enable performance of the various functions disclosed herein. For example, some software modules 116 may configure internal devices and/or logic circuits 122 of the processor 104, and may manage access to external devices such as the transceiver 112, the bus interface 108, the user interface 118, timers, mathematical coprocessors, and so on. The software modules 116 may include a control program and/or an operating system that interacts with interrupt handlers and device drivers, and that controls access to various resources provided by the processing circuit 102. The resources may include memory, processing time, access to the transceiver, the user interface 118, and so on.

One or more processors 104 of the processing circuit 102 may be multifunctional, whereby some of the software modules 116 are loaded and configured to perform different functions or different instances of the same function. The one or more processors 104 may additionally be adapted to manage background tasks initiated in response to inputs from the user interface 118, the transceiver 112, and device drivers, for example. To support the performance of multiple functions, the one or more processors 104 may be configured to provide a multitasking environment, whereby each of a plurality of functions is implemented as a set of tasks serviced by the one or more processors 104 as needed or desired. In one example, the multitasking environment may be implemented using a timesharing program 120 that passes control of a processor 104 between different tasks, whereby each task returns control of the one or more processors 104 to the timesharing program 120 upon completion of any outstanding operations and/or in response to an input such as an interrupt. When a task has control of the one or more processors 104, the processing circuit is effectively specialized for the purposes addressed by the function associated with the controlling task. The timesharing program 120 may include an operating system, a main loop that transfers control on a round-robin basis, a function that allocates control of the one or more processors 104 in accordance with a prioritization of the functions, and/or an interrupt driven main loop that responds to external events by providing control of the one or more processors 104 to a handling function.

Figure 2:
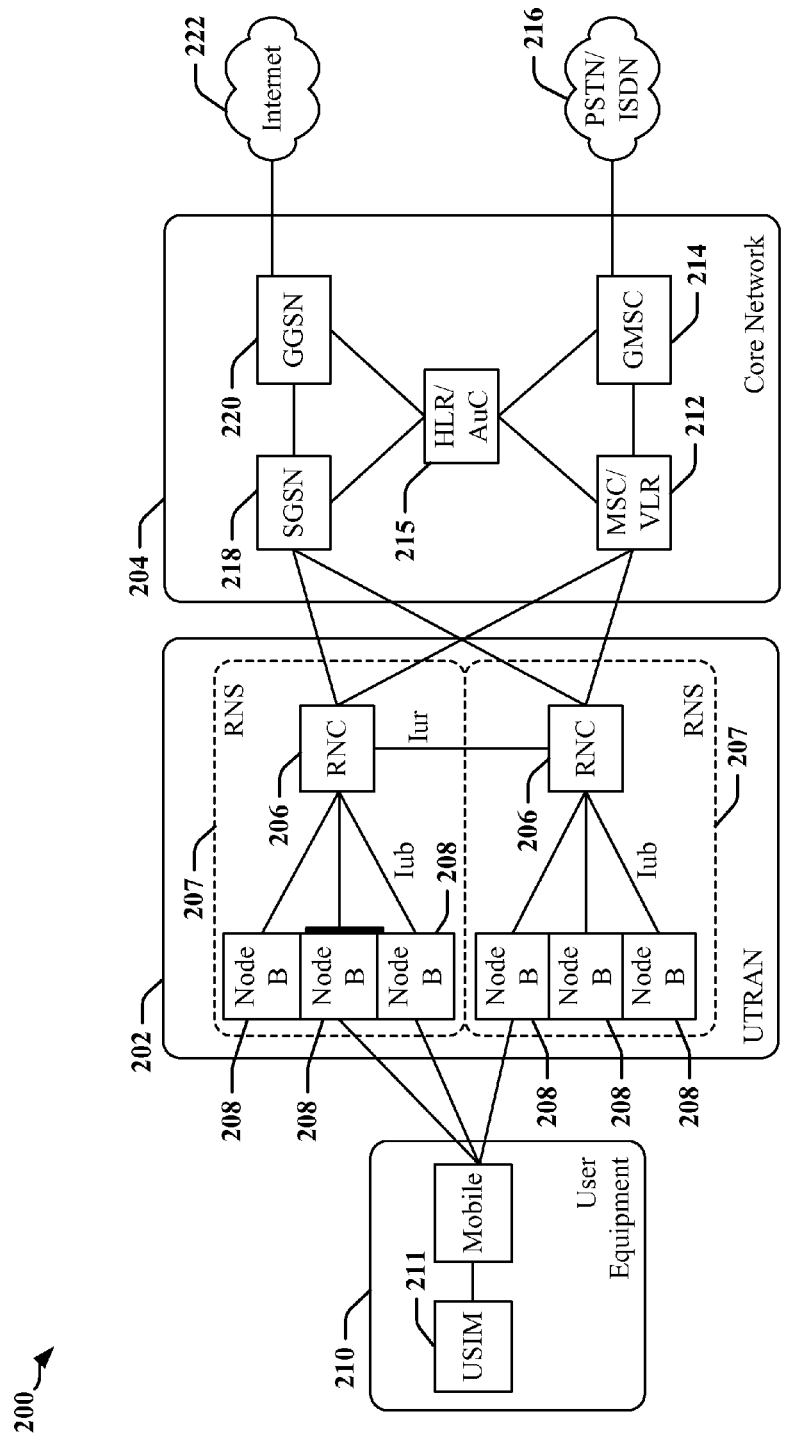
FIG. 2 is a conceptual diagram illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) 200. A UMTS 200 includes three interacting domains: a core network 204, a RAN (e.g., the UTRAN) 202, and a UE 210. Among several options available for the illustrated example, the UTRAN 202 may employ a W-CDMA air interface for enabling various wireless services including telephony, video, data, messaging, broadcasts, and/or other services. The UTRAN 202 may include a plurality of Radio Network Subsystems (RNSs) 207, each controlled by a respective Radio Network Controller (RNC) 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each depicted RNS 207; however, the RNSs 207 may include any number of wireless Node Bs 208. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device.

The mobile apparatus is commonly referred to as user equipment or UE 210 in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS, the UE 210 may further include a universal subscriber identity module (USIM) 211, which contains a user's subscription information to a network. The UE 210 may include a plurality of USIMs 211. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs 210 with access to types of core networks other than UMTS core networks 204.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, such as Equipment Identity Register (EIR), a VLR, a home location register (HLR), and/or an authentication center (AuC) may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs 206 may be connected to the MSC 212. The MSC 212 is an apparatus that controls call setup, call routing, and UE mobility functions. The MSC 212 also includes a VLR that contains subscriber-related information for the duration that a UE 210 is in the coverage area of the MSC 212. The GMSC 214 provides a gateway through the MSC 212 for the UE 210 to access a circuit-switched network 216. The GMSC 214 includes an HLR 215 containing subscriber data, such as the data reflecting the details of the services to which a particular user has subscribed. The HLR 215 is also associated with an AuC that contains subscriber-specific authentication data. When a call is received for a particular UE 210, the GMSC 214 queries the HLR 215 to determine the location of the UE 210 and forwards the call to the particular MSC 212 serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN 202 is one example of a RAN that may be utilized in accordance with the present disclosure.

Figure 3:
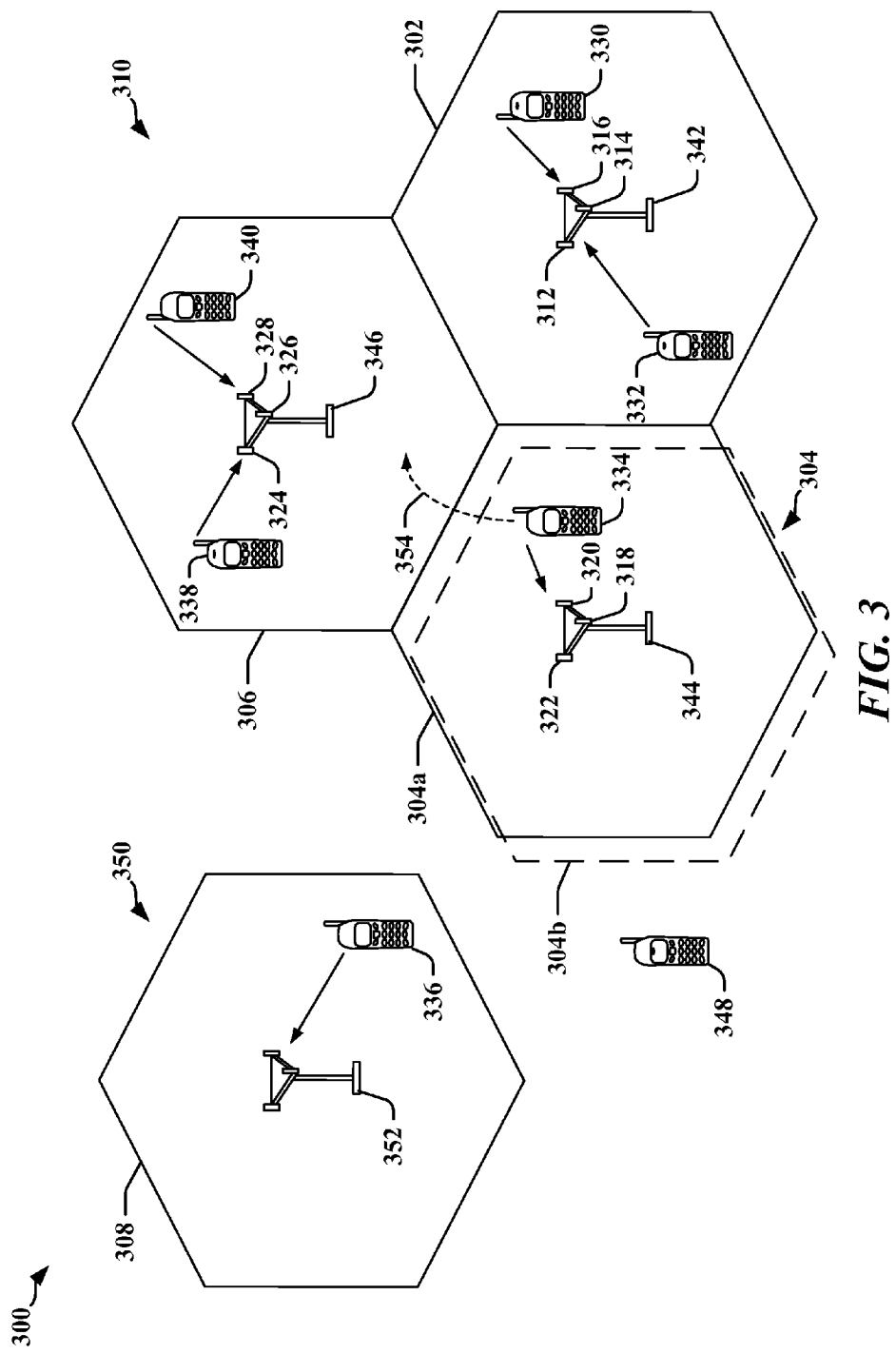
FIG. 3 is a conceptual diagram illustrating an example of an access network.

Referring to FIG. 3, by way of example and without limitation, a simplified schematic illustration of a network-ing environment 300 that includes a UTRAN architecture is illustrated. A RAN 310 may include multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304*a* may utilize a first scrambling code, and cell 304*b*, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UE 334 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 338, and 340 in the respective cells 302, 304, and 306.

During a call with a source cell 304, or at any other time, a UE 334 may monitor various parameters of the source cell 304 as well as various parameters of neighboring cells 302, 306. Further, depending on the quality of these parameters, the UE 334 may maintain communication with one or more of the neighboring cells 302, 306. During this time, the UE 334 may maintain an Active Set, that is, a list of cells to which the UE 334 is simultaneously connected. In one example, the UTRAN cells 302, 304, and/or 306 that are currently assigning a downlink dedicated physical channel (DPCH) or fractional downlink dedicated physical channel (F-DPCH) to the UE 334 may constitute the Active Set.

The access network 310 and core network 204 may correspond to a HPLMN for one or more of the UEs 330, 332, 334, 336, 338, 340 and/or 348. The HPLMN for a UE 330, 332, 334, 336, 338, 340 and/or 348 may be indicated by a USIM 211.

Certain UEs 336 and 348 may be associated with the HPLMN that corresponds to the access network 310 and core network 204, but may be physically located outside of the coverage area of the cells 302, 304, and 306 in the access network 310. For example, one UE 336 may be located within the coverage area of a cell 308 provided by a Node B 352. The Node B 352 may be part of an access network 350 that is associated with a second PLMN. The UE 336 may be in communication with the Node B 352 as a roaming device, with the second PLMN being considered a VPLMN for the UE 336. In another example, a UE 348 may be located outside the coverage area of any cell 302, 304, 306 and 308, and may be in an out of service (OOS) status.

A handover may be executed as a UE 330, 332, 334, 336, 338, 340 or 348 transitions between two cells 302, 304, 306 and/or 308. In one example, a UE 334 may move from a location in a first cell 304 in a direction 354 toward and into a second cell 306, and a serving cell change (SCC) or handover may occur in which communication with the UE 334 transitions from the first cell 304, which may be referred to as the source cell, to the second cell 306, which may be referred to as the target cell. Management of the handover procedure may take place at the UE 334, at the Node Bs 344, 346 corresponding to the respective cells, at a radio network controller 206 (see FIG. 2), or at another suitable node in the wireless network.

In many wireless communication networks, a UE 334 may be configured to establish voice communication with another user by way of a PLMN. Information identifying a PLMN, information characterizing a RAN associated with the PLMN, and other information relevant to a PLMN search may be received from system information broadcast over the RAN. The UE 334 may identify a PLMN based on a PLMN ID, which generally includes a mobile country code (MCC) and a mobile network code (MNC). The MCC generally identifies the country in which the PLMN is located, and the MNC generally identifies the service provider or operator for that PLMN. The UE 334 may be configured to select a PLMN from various PLMNs that are available for service at a given time and location. A UE 334 may be configured to automatically search for a preferred or suitable PLMN, and in at least some instances, a user of the UE 334 may manually initiate a PLMN search through a user interface (UI) to find the preferred or suitable PLMN. In one example, a preferred PLMN may be a PLMN in which the UE 334 is registered, tracked or otherwise known. In another example, a preferred PLMN may be associated with service provider associated with a user of the UE 334. In another example, a preferred or suitable PLMN may be accessible using a radio access technology (RAT) supported by the UE 334. The UE 334 may be configured with a list of PLMNs prioritized according to service provider, RAT and other characteristics, and the UE 334 may identify a suitable PLMN by its presence in the prioritized list of PLMNs. The UE 334 may identify and/or select a preferred PLMN based on its priority in the list.

The UE 334 may perform a PLMN search by scanning across a plurality of bands, and scanning across a plurality of RATs. A RAT may refer to the air interface for a wireless communication system, with one example being the W-CDMA air interface described above in connection with the UTRAN, although there are many other examples of RATs, including but not limited to the TD-SCDMA air interface in connection with the UTRAN, GSM, Long Term Evolution (LTE), cdma2000, Evolution-Data Optimized (EV-DO), etc. The frequency scan and/or RAT scan may produce a list of PLMNs from which a suitable or preferred PLMN may be selected.

When a UE 336 or 348 is not associated with, and/or is located outside of its HPLMN, the UE 336, 348 may periodically perform a background PLMN search to determine whether a cell 302, 304, 306 associated with the HPLMN is available. For example, a UE 336, 348 may set a search timer to start a background PLMN search every 10 minutes. The UE 336, 348 may search multiple frequencies for cells 302, 304, 306 associated with the HPLMN. A background PLMN search may include an acquisition database scan and a full band scan. For each frequency, the PLMN search may include an acquisition scan and system information block (SIB) reading. The UE 336, 348 may attempt to acquire a cell located or identified during the PLMN search. Acquisition typically entails determining one or more downlink scrambling codes as well as slot and frame synchronization information for the cell. Acquisition information (e.g., information used for acquisition) may include synchronization codes, a code group identification, a primary scrambling code, a secondary scrambling code, and a spreading code such as a pseudo-random code, which may be referred to as a pseudo-noise (PN) code.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210.

Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high-speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

Figure 4:
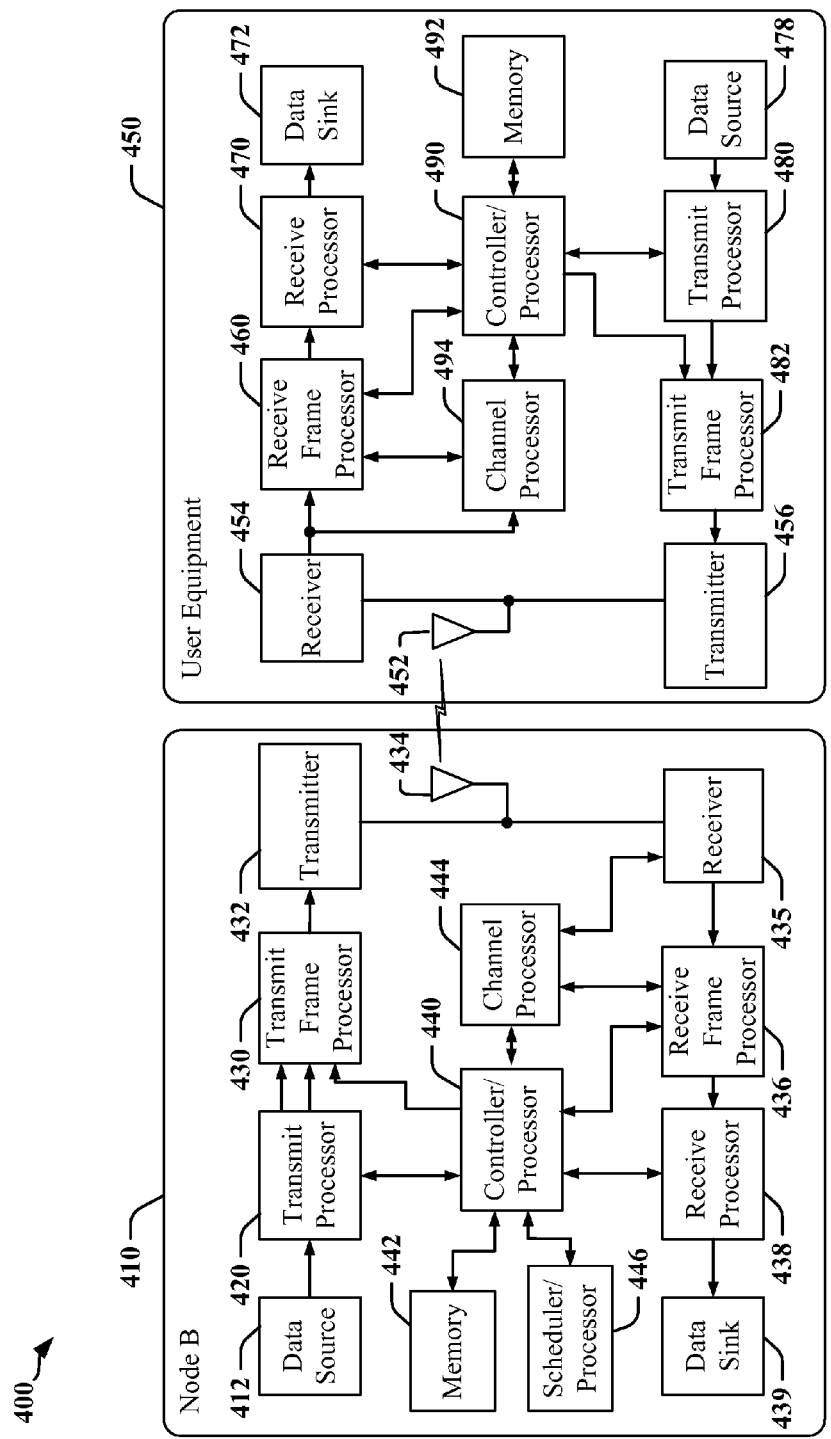
FIG. 4 is a conceptual diagram illustrating an example of a Node B in communication with a UE in a telecommunications system.

FIG. 4 is a block diagram illustrating an example of a Node B 410 in communication with a UE 450, where the Node B 410 may be the Node B 208 in FIG. 2, and the UE 450 may be the UE 210 in FIG. 2. Each of the Node B 410 and the UE 450 may include one or more processing circuits such as the processing circuit 102 of FIG. 1. In the downlink communication, a transmit processor 420 of the Node B 410 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by the controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., a display). Control signals carried by successfully decoded frames are provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 in the UE 450, and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in a midamble transmitted by the Node B 410, may be used to select the appropriate coding, modulation, spreading, and/or scrambling schemes. The symbols produced by the transmit processor 480 may be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to UEs and schedule downlink and uplink transmissions for the UEs.

In a wireless telecommunication system, the communication protocol architecture may take on various forms depending on the particular application. For example, in a 3GPP UMTS, the signaling protocol stack is divided into a Non-Access Stratum (NAS) and an Access Stratum (AS). The NAS provides the upper layers for signaling between the UE 210 and the core network 204 (referring to FIG. 2), and may include circuit switched and packet switched protocols. The AS provides the lower layers for signaling between the UTRAN 202 and the UE 210, and may include a control plane and a user plane. Here, the user plane (or data plane) carries user traffic, while the control plane carries control information (i.e., signaling).

Figure 5:
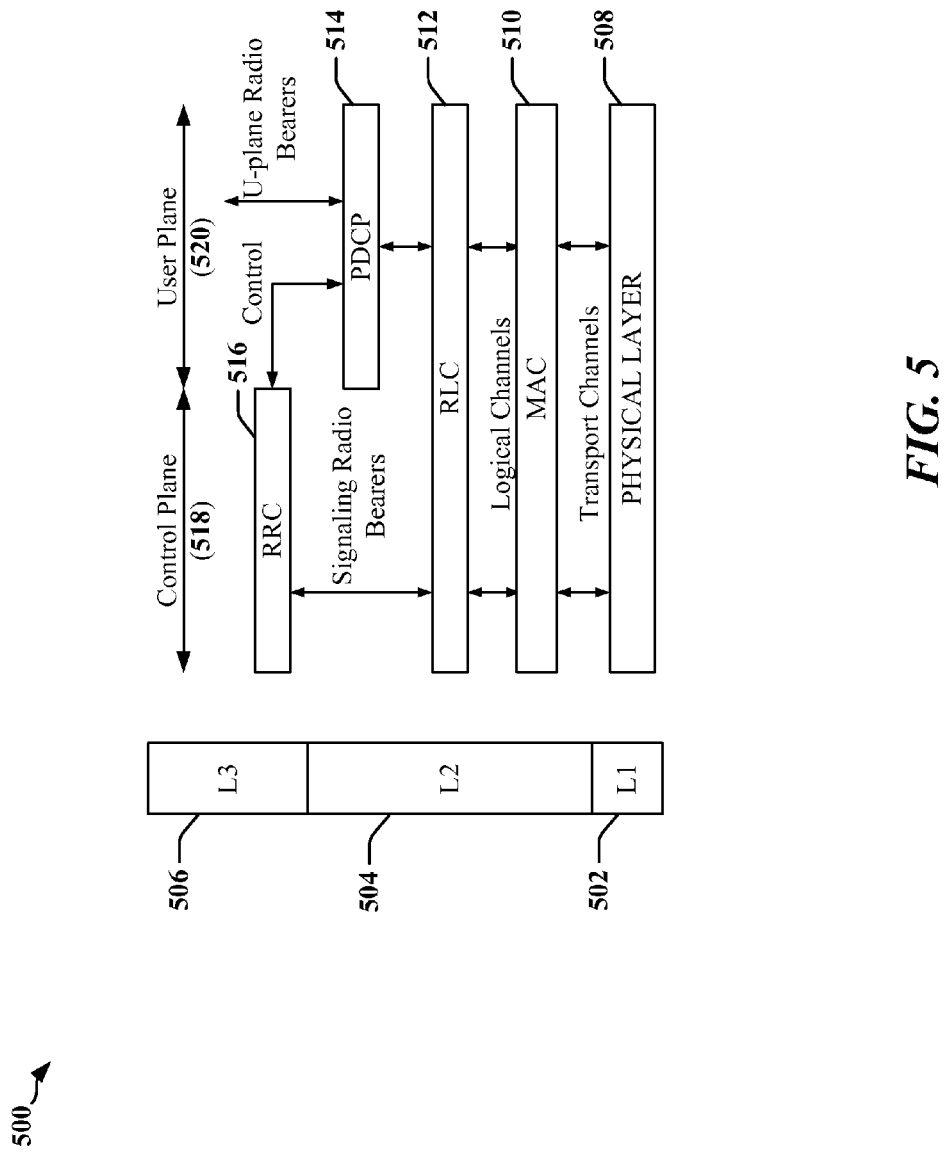
FIG. 5 is a conceptual diagram illustrating an example of a radio protocol architecture for the user and control plane.

Turning now to FIG. 5, an example of an AS 500 is shown with three layers 502, 504, 506. The lowest layer (Layer 1) 502 implements various physical layer signal processing functions. Layer 1 502 may include the physical layer 508. A second layer (Layer 2) 504 may be referred to as the data link layer 504, and includes sub-layers 510, 512, 514 that are provided above the physical layer 508. The data link layer 504 is responsible for the link between the UE 210 and Node B 208 over the physical layer 508.

The third layer (Layer 3) 506 may be referred to as the radio resource control (RRC) layer 506, which includes sub-layers that handle control plane 518 signaling between the UE 210 and the Node B 208. The RRC layer 506 includes a number of functional entities 516 for routing higher layer messages, handling broadcasting and paging functions, establishing and configuring radio bearers, etc.

In the illustrated air interface, the data link layer 504 is split into multiple sub-layers 510, 512, 514. In the control plane 518, the data link layer 504 includes two sub-layers: a medium access control (MAC) sub-layer 510 and a radio link control (RLC) sub-layer 512. In the user plane 520, the data link layer 504 additionally includes a packet data convergence protocol (PDCP) sub-layer 514. Although not shown, the UE 210 may have several upper layers above the L2 layer 504 including a network layer (e.g., IP layer) that is terminated at a packet data network (PDN) gateway on the network side and an application layer that is terminated at the other end of the connection (e.g., far-end UE, server, etc.). The PDCP sub-layer 514 provides multiplexing between different radio bearers and logical channels. The PDCP sub-layer 514 also provides header compression for upper layer data packets to reduce radio transmission overhead, security by ciphering the data packets, and handover support for UEs between Node Bs.

The RLC sub-layer 512 generally supports an acknowledged mode (AM) in which an acknowledgment and retransmission process may be used for error correction, an unacknowledged mode (UM), and a transparent mode for data transfers. The RLC sub-layer 512 provides segmentation and reassembly of upper layer data packets and reordering of data packets to compensate for out-of-order reception due to a hybrid automatic repeat request (HARQ) at the MAC layer 510. In the acknowledged mode, RLC peer entities such as an RNC 206 and a UE 210 may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sub-layer 510 provides multiplexing between logical and transport channels. The MAC sub-layer 510 is responsible for allocating the various radio resources (e.g., resource blocks) in one cell among the UEs. The MAC sub-layer 510 is also responsible for HARQ operations.

Certain RRC states are defined that characterize the relationship between a UE 210 and the UMTS 200. The RRC states may identify a level of activity associated with the UE 210 including, for example, whether the UE 210 is known on a cell, and whether the UE 210 is configured for discontinuous reception (DRX). The RRC states may determine which physical channels are available and/or allocated to the UE 210, and thus which transport channels can be used for communication with the UE 210. The RRC states may also determine which types of RRC connection mobility procedures can be used in association with the UE 210.

Figure 6:
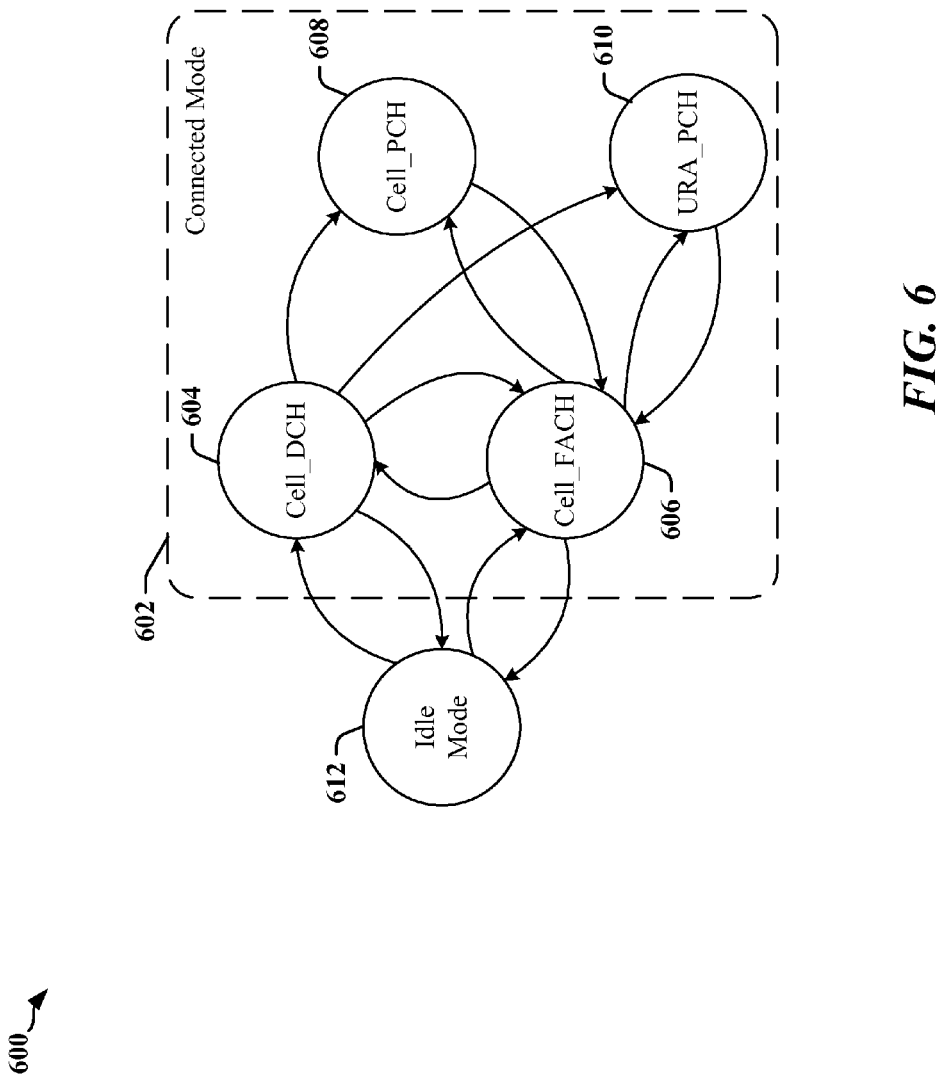
FIG. 6 is a state diagram illustrating certain operational modes of a UE in a UMTS network.

FIG. 6 is a state diagram illustrating certain RRC states and operational modes of the UE 210 in the UMTS 200 described above, for example. Two basic operational modes of the UE 210 are connected mode 602 and idle mode 612. The connected mode 602 can be further divided into a number of service states 604, 606, 608, 610, which define what kind of physical channels the UE 210 may use. FIG. 6 shows the main RRC service states 604, 606, 608 and/or 610 in the connected mode 602 and shows the transitions between service states of the connected mode 602 and the idle mode 612, as well as certain possible transitions between states 604, 606, 608 and/or 610 within the connected mode 602. In the idle mode 612, the UE 210 is able to receive system information and cell broadcast (CB) messages. The UE 210 stays in the idle mode 612 until it transmits a request to establish an RRC connection. The UTRAN 202 typically does not have, or maintain information about individual idle-mode UEs and may only address, for example, all UEs in a cell or all UEs that are monitoring a paging occasion.

In the connected mode 602, the UE 210 may be using a dedicated channel (DCH) in a Cell_DCH state 604, a forward access channel in a Cell_FACH state 606, a paging channel (PCH) in a Cell PCH_state 608, or a PCH to read UTRAN registration area (URA) in a URA_PCH state 610. In the Cell_DCH state 604, a dedicated physical channel is allocated to the UE 210, and the UE 210 is known by its serving RNC 206 on a cell or active set level. In the Cell_FACH state 606, no dedicated physical channel is allocated for the UE 210, but random access channels (RACHs) and forward access channels (FACHs) are instead used for transmitting both signaling messages and small amounts of user-plane data. The power consumption of the UE 210 is typically less in the Cell_FACH state 606 than that of the Cell_DCH state 604.

In the Cell_PCH state 608, the UE 210 continues to be known on a cell level in the serving RNC (SRNC), but it may be reached only via the PCH. In this state, the battery consumption of the UE 210 can be less than its battery consumption in the Cell_DCH state 604 and/or the Cell_FACH state 606 because the monitoring of the PCH includes a DRX functionality. If the UE 210 performs a cell reselection, then it moves autonomously to the Cell_FACH state 606 to execute the Cell Update procedure, after which it re-enters the Cell_PCH state 610 if no other activity is triggered during the Cell Update procedure. If a new cell is selected from another radio access system, then the RRC state is changed to the idle mode 612, and access to the other system is performed according to that system's specifications.

The URA_PCH state 610 is similar to the Cell_PCH state 608, except that the UE 210 may not execute Cell Update after each cell reselection, but instead may read URA identities from the PCH, and only if the URA changes (after cell reselection) may the UE 210 inform the SRNC of its location. The power consumption of the UE 210 is typically less in the URA_PCH state 608 than that of the Cell_DCH state 604 and/or the Cell_FACH state 606.

The UE 210 leaves the connected mode 602 and returns to the idle mode 612 when the RRC connection is released or after an RRC connection failure. Transitioning the UE 210 among the above states involves exchanging control messages on the control channels. For example, the UE 210 can send a signaling connection release indication (SCRI) to the RNC 206. Based on the values of the received SCRI, the RNC 206 may command the UE 210 to use the Cell_PCH state 608 or the URA_PCH state 610, instead of releasing the RRC connection and dropping the UE 210 into the idle mode 612. In another example, the RNC 206 can command the UE 210 to drop to the idle mode 612 directly from the Cell_DCH state 604.

In the idle mode 612, the UE 210 can transition to the Cell_DCH state 604 or Cell_FACH state 606, where the transition from the idle mode 612 is initiated by an RRC connection request. This transition involves setting up the necessary radio access bearers (RABs). Transitions from the Cell_FACH state 606 or Cell_DCH state 604 to the Cell_PCH state 608 involves tearing down RABs that have been allocated. A transition from the Cell_DCH state 604 to the Cell_FACH state 606 involves withdrawing the power and code allocated to the UE 210.

RRC reconfiguration procedures can be used to change the RRC state of the UE 210 including, for example, from the Cell_PCH state 608 to the Cell_FACH state 606 and vice versa. RRC reconfiguration procedures include a radio bearer establishment procedure, a radio bearer reconfiguration procedure, a radio bearer release procedure, a transport channel reconfiguration procedure, and a physical channel reconfiguration procedure. The physical channel reconfiguration procedure can be used to establish, reconfigure, and release physical channels.

The radio bearer establishment procedure may be used to establish new radio bearers. The radio bearer reconfiguration procedure may be used to reconfigure parameters for a radio bearer. The radio bearer release procedure may be used to release radio bearers. The transport channel reconfiguration procedure may be used to reconfigure transport channel parameters. The physical channel reconfiguration procedure may be used to establish, reconfigure, and release physical channels.

The PCH is a downlink transport channel that is associated with the transmission of physical-layer generated Paging Indicators, to support efficient power-down or sleep-mode procedures. System information broadcast on a cell may identify certain common channels to be employed in idle mode. One or more PCHs may be established in a cell and carried in a Secondary Common Control Physical Channel (SCCPCH) indicated to the UE 210 in the system information. Each PCH is uniquely associated with a Paging Indicator Channel (PICH), which is a fixed rate physical channel used to carry Paging Indicators (PIs). The UE 210 may be configured for DRX in idle mode to reduce power consumption. Power consumption can affect the maximum operational time of a UE 210, and can also significantly limit the data bandwidth of the UE 210.

A UE 210 operating in a RAN configured for DRX may be configured to power off its radio receiver for a predefined interval of time (the DRX interval) while in idle mode 612. When DRX is used, the UE 210 may monitor a single PI in one Paging Occasion per DRX cycle, where the DRX cycle includes the DRX interval and a period of time during which the UE 210 powers-up its receiver to receive a page. The Paging Occasion may occur when the network transmits a list of UEs that have pending packets or calls. The DRX interval and the time between consecutive pages (the paging interval) can be periodic, aperiodic and/or intermittent. The DRX interval and/or the paging interval may be predefined, or may be determined by the UE 210 or the network based on network conditions, system configuration and other such factors. The DRX interval and/or the paging interval may be communicated in system information transmitted on the network.

A UE 210 in idle mode 612 is generally expected to wake up before a page arrives, synchronize with the network and read the list of UEs. If a UE 210 is identified during the page as having a packet ready for reading, the UE 210 may transmit a Receiver Ready frame in order to receive the packet or call.

The DRX cycle may be defined by the network. In some instances, a UE 210 may elect to ignore a page, in order to further reduce its power consumption. In some UMTS implementations, the UE 210 may be configured to negotiate its DRX cycle timing, whereby the network transmits pages referencing the UE 210 in accordance with the negotiated schedule.

The DRX feature can be handled using a finite state machine that operates according to the state diagram 600. In an RRC connected mode 602, the UE 210 obtains a dedicated channel in accordance with the type of RRC connected mode 602, as discussed herein. In the idle mode 612, the UE 210 may be tracked by the core network 204 (see FIG. 2) without the involvement of the UTRAN 202. A paging procedure may be used to transmit paging information to selected UEs in idle mode 612, CELL_PCH 608 or URA_PCH 610 using a paging control channel (PCCH). Upper layers in the network may request paging to establish a signaling connection, or for other reasons. The UTRAN 202 may initiate paging for UEs in CELL_PCH 608 or URA_PCH 610 to trigger a cell update procedure. In addition, the UTRAN 202 may initiate paging for a UE 210 that is in idle mode 612, CELL_PCH 608 or URA_PCH 610 to trigger reading of updated system information.

In many wireless communication networks, a UE 210 may be configured to establish voice communication with another user by way of a PLMN. A PLMN may be identified by a PLMN ID, which generally includes a mobile country code (MCC) and a mobile network code (MNC). The MCC generally identifies the country in which the PLMN is located, and the MNC generally identifies the service provider or operator for that PLMN. In many cases, there is more than one PLMN that a user can utilize for service at a given time and location.

In the idle mode 612, the UE 210 may select a PLMN to contact. The UE 210 may select a cell of the chosen PLMN to access network services and may camp on the selected cell by tuning to a control channel of the selected cell. While in the idle mode 612 and camped on a cell, the UE 210 may receive system information and CB messages. The UE 210 may be configured to remain in idle mode and camped on the cell if an RRC connection is needed. In idle mode the UE 210 may be identified to the network through one or more NAS identities, including an international mobile subscriber identity (IMSI), a temporary mobile subscriber identity (TMSI), or a packet TMSI (P-TMSI). The UTRAN 202 typically maintains no information regarding idle-mode UEs and addresses idle-mode UEs through broadcasts to all UEs in a cell or to all UEs that are monitoring a paging occasion.

The UE 210 may receive system information generated or communicated by the core network 204, from an RNC 206 and/or from a Node B 208. System information is broadcast in system information messages to provide the UE 210 with information used for decoding and reading information received from the UTRAN 202. The system information may be sent on a logical channel that is mapped to a broadcast channel (BCH) or FACH transport channel. In one example, the system information is broadcast on a logical Broadcast Control Channel (BCCH) that is mapped to the BCH for transmission on a Primary Common Control Physical Channel (PCCPCH), which may operate at a fixed signaling rate. In another example, the BCCH is mapped to the FACH for transmission on a SCCPCH.

System information messages transmitted from UTRAN 202 to the UE 210 typically carry system information blocks (SIBs), which group together system information elements of the same nature. Static parameters, or infrequently changing parameters may be grouped and carried in SIBs that do not carry frequently changing or dynamic parameters, and vice versa. A single system information message can carry multiple SIBs or a portion of a single SIB, based on the size of the SIBs to be transmitted. A complete set of system information is typically divided into BCH transport blocks, which may be transmitted in two or more frames. Certain SIBs may be segmented and concatenated at the RRC layer 516 when transmission in multiple BCH transport blocks is required.

SIBs may be organized as a tree, with a MIB providing reference and scheduling information for a plurality of SIBs in a cell. The MIB may include reference and scheduling information for scheduling blocks, which provide references and scheduling information for additional SIBs. The MIB is typically transmitted on the BCH according to a static schedule. A MIB may identify certain supported PLMN types, a PLMN identity and/or other core network information, while the SIBs provide more detailed system information.

Scheduling information provided by the MIB may include SIB-specific timers for SIBs that communicate dynamically changing information, and these timers may be used by the UE 210 to control periodic reading of each block by the UE 210. The MIB may provide a flag or "value tag" that identifies when a static or slowly changing parameter should be updated at the UE 210. For example, the UE 210 may compare a value tag in the MIB with a previously read value tag for a specific SIB and may read the SIB only of the value tag that has changed. Thus, by monitoring the MIB and/or the scheduling blocks, the UE 210 may determine when static SIBs have changed.

A UE 210 typically prefers to camp on a home PLMN (HPLMN), which may be a PLMN provided by a service provider associated with the UE 210. However, the home PLMN may not always be accessible when the UE 210 is roaming, and the UE 210 may camp on a different PLMN as a visitor (the roaming PLMN). Typically, the UE 210 performs a background PLMN search to locate a cell in a high priority PLMN (HP-PLMN) and/or a HPLMN when the UE 210 is in a roaming area. The PLMN search may be prolonged and it may be difficult for the UE 210 to complete a PLMN search between paging intervals. According to certain aspects disclosed herein, the UE 210 may be configured or adapted to perform a PLMN search that accommodates paging schedules or requirements of a serving cell while reading a MIB and/or SIBs that are used to determine characteristics and/or suitability of a PLMN that is not associated with the serving cell. SIBs that are used to determine characteristics and/or suitability of a PLMN may contain NAS system information, UE timers and counters for use in connected modes and idle mode, cell information used for cell acquisition, selection and/or reselection, PLMN identifiers and other information identifying characteristics of a network, cell and/or service provider. Some such information may be included in a SIB-1 and/or a SIB-3, for example.

Figure 7:
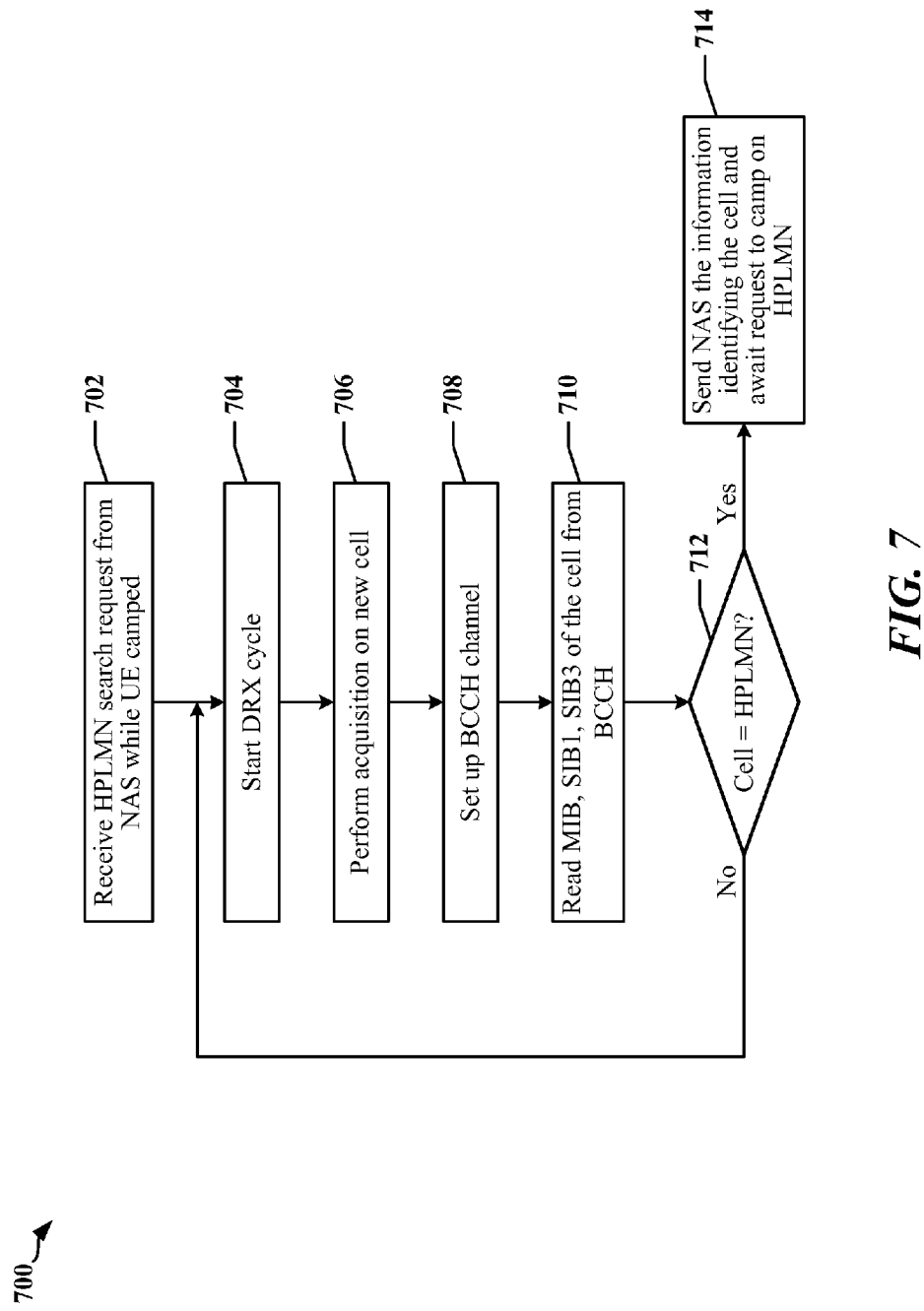
FIG. 7 is a flow chart illustrating a basic PLMN search process.
Figure 8:
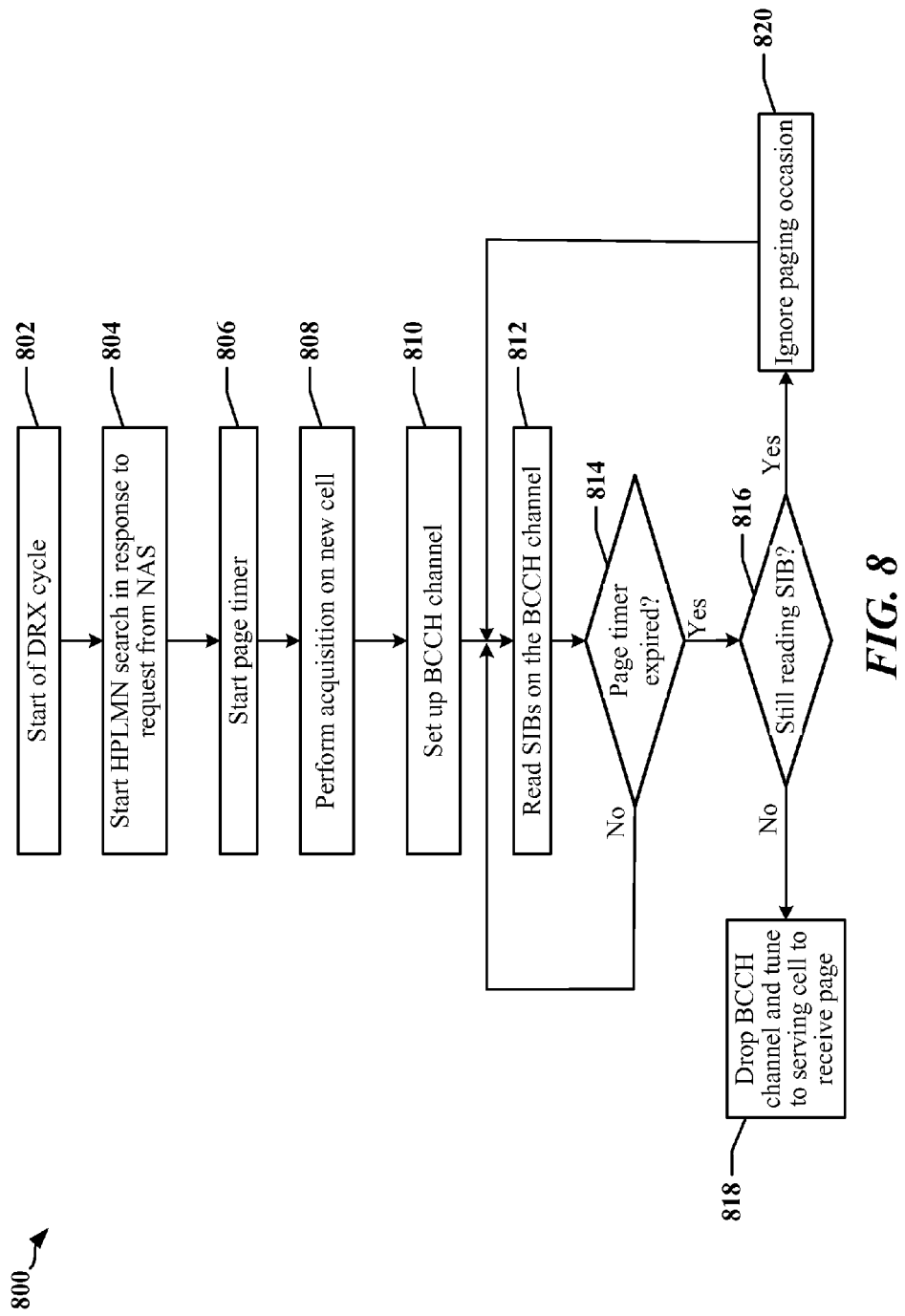
FIG. 8 is a flow chart illustrating a basic PLMN search process employed when the UE is camped on a PLMN.
Figure 9:
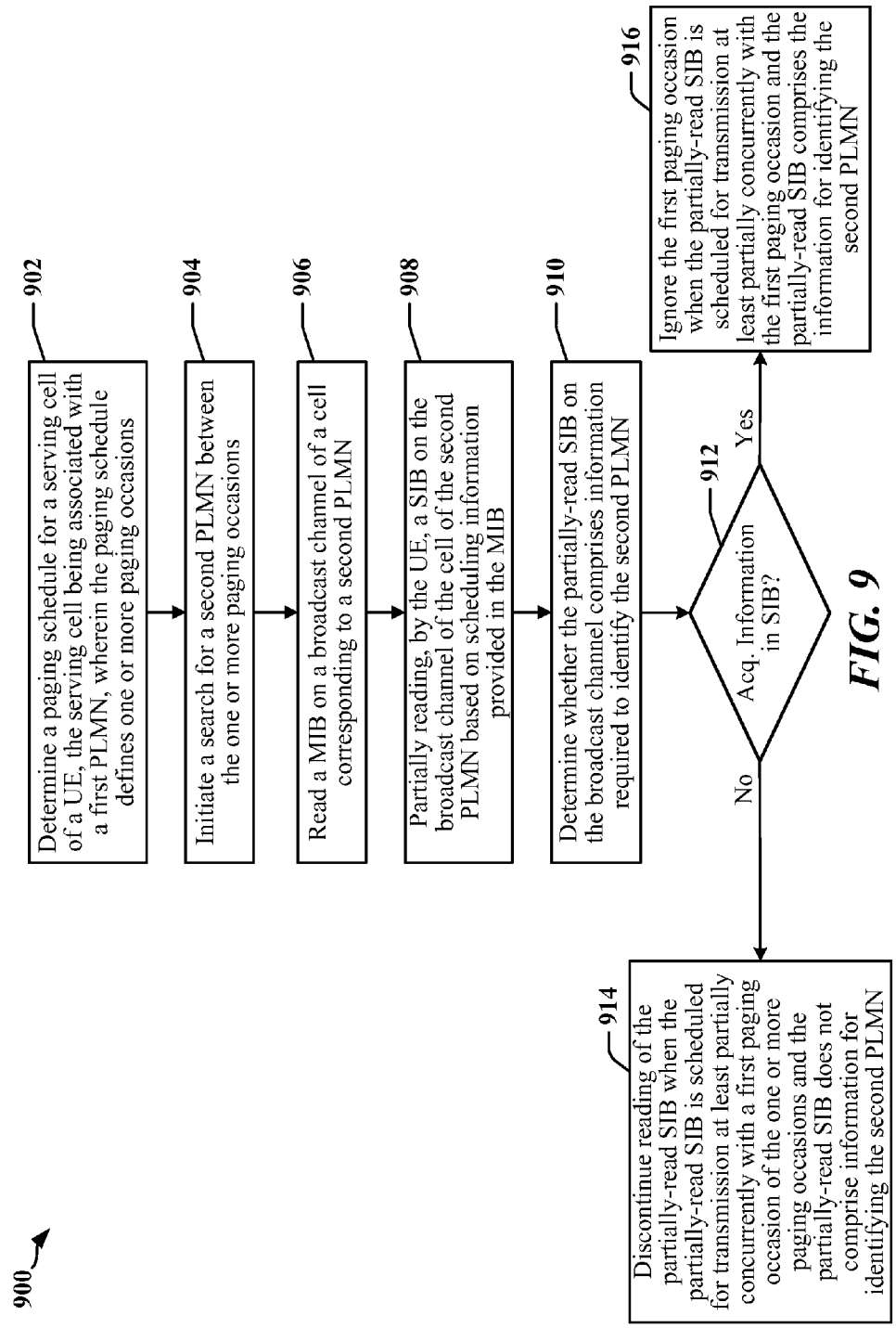
FIG. 9 is a flow chart of an example of a PLMN search method according to certain aspects disclosed herein.

FIGS. 7-9 include flowcharts that represent processes and methods related to the performance of a PLMN search. While, for purposes of simplicity of explanation, each of the processes or methods is shown and described as a series of acts, it is to be understood and appreciated that the process or method, and further methods related thereto, is not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein FIG. 7 is a flowchart illustrating a generalized PLMN search procedure. At block 702, the UE 210 may receive a request from the NAS to search for a HPLMN while camped on a serving cell of a VPLMN. At block 704, the UE 210 may start the HPLMN search, typically at the start of a DRX cycle and/or after completing the handling of a page from the serving cell. During the PLMN search, the UE 210 may scan all available cells in frequency bands supported by the UE 210 to identify potential acquisition targets. The UE 210 may perform a cell acquisition at block 706 to acquire any available cell in order to read system information of each identified cell. Typically, the system information of interest may be found in the MIB, SIB-1 and SIB-3 broadcast by an acquisition target. Accordingly, at block 708, the UE 210 may attempt to camp on a cell of a candidate PLMN and may set up a BCCH channel. At block 710, the UE 210 may read the MIB and SIBs of the candidate cell in order to determine if the candidate cell corresponds to a HP-PLMN and/or HPLMN based on received system information. If, at block 712 it is determined that the candidate cell corresponds to a HP-PLMN and/or HPLMN, then the system information is provided to the NAS at block 714, and the NAS may then request that the UE 210 camp on the candidate cell. If, at block 712 it is determined that the candidate cell does not correspond to a HP-PLMN and/or HPLMN, then the background PLMN search may be resumed at block 704. It may be preferable to perform the background PLMN search in the timing gap between adjacent paging occasions of the roaming PLMN. However, it may not be possible to complete reception of the SIBs of the candidate cell before the next page occurs. If the UE 210 does not suspend the search before occurrence of a paging occasion in order to read the next page, the page may be missed.

The tension between receiving pages and acquiring system information from a candidate cell may be resolved, in one approach, by suspending the PLMN search for each scheduled paging occasion in order to receive the page. However, this approach may render it difficult or impossible to complete the PLMN search if the background PLMN search is suspended to receive each page, because the UE 210 may not be able to completely receive all SIBs in the time available between consecutive pages, even if the PLMN search is suspended just before the occurrence of the paging occasion such that the UE 210 has sufficient time to tune to a serving cell frequency and read the page broadcast by network. Accordingly, in conventional systems, paging intervals may be ignored during PLMN searches.

FIG. 8 illustrates a background PLMN search procedure in which pages are skipped when a background PLMN search is in progress. The background PLMN search procedure may commence at block 802 at the commencement of a DRX cycle and/or after a roaming UE 210 completes handling of a page from a serving cell of a visitor PLMN. At block 804, the UE 210 may initiate a search for an HPLMN in response to a request from the NAS. At block 806, the UE 210 may start a timer based on the paging schedule, where the timer indicates when a next page will occur. During the PLMN search, the UE 210 may scan all available cells in frequency bands supported by the UE 210 and may perform an acquisition at block 808 of any available cell in order to read system information in the MIB, SIB1 and SIB3 of each available cell.

At block 810, the UE 210 may attempt to camp on a cell of a candidate PLMN and may set up a BCCH channel. The UE 210 may then read the MIB and SIBs of the candidate cell at block 812 in order to determine if the candidate cell corresponds to a HP-PLMN and/or HPLMN based on received system information. The UE 210 may periodically check the page timer or may be interrupted by the page timer upon its expiration. In this regard, the UE 210 may determine whether the timer has expired at block 814 and then proceed to block 816 if the timer has expired. If the timer has not expired, the UE 210 may continue reading SIBs on the BCCH channel at block 812.

Upon determining at block 814 that the page timer has expired, the UE 210 may determine at block 816 whether a SIB is being received and, if so, may proceed to block 820. At block 820, the UE 210 may ignore the current paging occasion and reset the page timer for the next paging occasion before proceeding to block 812. The UE 210 may continue to receive the SIB at block 812 after the current paging occasion is ignored. If the UE 210 determines at block 816 that a SIB is not currently being received, the UE 210 may drop the BCCH channel and receive the page at block 818.

As illustrated in FIG. 8, if the UE 210 is in the process of reading SIBs of a cell during a background PLMN (BPLMN) and/or HP-PLMN search, the UE 210 may continue reading SIBs even if a page occasion is approaching and even if the continuation of reading the SIBs may lead to a missed page. For example, the UE 210 may be configured to continue to read the SIBs because the SIBs may identify a HPLMN cell for which the search was initiated. It is quite likely that the UE 210 may miss a page every time it attempts to read the SIBs of a cell identified by a background PLMN search. Accordingly, page misses may occur frequently and sequential page misses may occur when the UE 210 is in a roaming area. The network typically repeats a page for which no response is received from the UE 210, but the operation of reading SIBs for a cell identified in the PLMN search may extend to multiple paging cycles, and there is a possibility that UE 210 may miss a mobile terminated call. The resulting poor performance of the UE 210 and poor user experience may be exacerbated when SIBs are scheduled with a lower repetition rate.

According to certain aspects of the disclosure, the UE 210 may be configured to employ a modified PLMN search procedure that lessens the risk of missing a page during the PLMN search. In the modified PLMN search, the UE 210 may receive pages, but may store the MIB and any SIBs that have already been received prior to receiving the page such that the search can be continued without repeating the capture of SIBs already received.

In another aspect, the modified PLMN search may involve the UE 210 ignoring pages only when a MIB and/or certain high-priority SIBs are being received. In one example, the UE 210 may prioritize only the MIB and SIB-1 and SIB-3 for each cell detected and/or identified as being in the vicinity of the UE 210 during a PLMN search. The reading of other SIBs may be handled as a lower priority task, and the UE 210 may receive pages even if a paging occasion occurs while lower-priority SIBs are being received. The MIB provides the scheduling information of the SIB-1 and SIB-3. This scheduling information may be used to determine whether a page occasion should be missed or observed. In one example, the page is missed when the scheduling information indicates that a SIB-1 or SIB-3 is to be transmitted at the same time as the page. However, if other SIBs are scheduled to be transmitted at the same time as the page, then the UE 210 may suspend the background PLMN search, and store in a memory or other storage medium, any information received in a MIB or SIBs that have already been received for an identified cell. The UE 210 may then receive the page, and after receipt of the page, the UE 210 may retrieve from storage the MIB and SIB information captured prior to suspension of the background PLMN search and continue to receive any remaining SIBs.

In operation, a limited number of pages may be missed during a PLMN search because some of the MIB and SIBs may be scheduled such that they can be read between pages, and a page may be skipped only when the timing of the page conflicts with a MIB or SIB that includes acquisition information or other important information for the UE 210, and/or to update information that may have aged. In some instances, the UE 210 may miss a page when the configuration of the network results in a transmission schedule for a SIB that always conflicts with page transmissions, due to the duration of the SIB transmission and/or timing and periodicities of the page and SIB transmissions with respect to one another. In one example, a MIB may be scheduled for 80 ms, SIB-1 may be scheduled for 320 ms, and SIB-3 may be scheduled for 640 ms, while the page interval may be defined as 640 ms. For this scheduling configuration, it may be possible to receive the MIB and SIB-1 without missing a page, while SIB-3 may be received if a page is missed. The page may be missed if the information in the MIB-3 is needed to complete a PLMN search. The page may be received when the scheduling of the page conflicts with the scheduling of a different SIB that does not include acquisition information or other important information. The processes described herein permit the UE 210 to selectively miss certain pages, while capturing those SIBs that are important to completing the background PLMN search. By configuring the UE 210 to miss a page so that the UE 210 can read the important SIBs, a current search can be completed and the next cell can be searched, while the number of missed pages can be minimized.

FIG. 9 is a flow chart illustrating method of wireless communication 900 according to certain aspects disclosed herein. The process may be operable at a UE 210. In one example, the method 900 may include conducting a PLMN search, which in certain examples may include a background PLMN search initiated and/or conducted while a UE 210 is roaming or out-of-service. The PLMN search may be configured to select an order of frequencies to be scanned and/or RATS to be searched. An algorithm may be defined or configured to determine the order of frequencies scanned. In one example, the UE 210 may first scan frequencies included in an acquisition database of known cells. If no HPLMN cell is located, the UE 210 may perform a full band scan until a cell is identified. The UE 210 may generate a list of frequencies where sufficient signal strength indicates the presence of a cell, and then attempt to acquire cells for such frequencies in order of decreasing signal strength.

During acquisition, a UE 210 may tune to a frequency and determine acquisition information such as a primary scrambling code, secondary scrambling code, and PN position or offset. The UE 210 may then be able to receive the BCCH of the cell. The BCCH may include a system information message including a MIB and a number of SIBs. The MIB and SIBs may provide information such as a cell identifier and PLMN information that the UE 210 may use to determine whether the cell corresponds to the HPLMN. A preferred PLMN may be identified as a PLMN that is accessible through a RAT used by the cell.

At block 902, the UE 210 may determine a paging schedule for a serving cell of the UE 210. The paging schedule may define one or more paging occasions. The UE 210 may determine the paging schedule through system information received while the UE 210 is camped on the serving cell. The serving cell may be associated with a first PLMN. The UE 210 may be roaming and camped on the serving cell. The first PLMN may be a visited PLMN.

At block 904, the UE 210 may initiate a search for a second PLMN between consecutive paging occasions. The search for the second PLMN may be initiated to find a home PLMN associated with the UE 210.

At block 906, the UE 210 may read a MIB on a broadcast channel of a cell of the second PLMN. The cell of the second PLMN may have been located during the PLMN search. The UE 210 may be configured to determine the identity and characteristics of the second PLMN from system information transmitted in the MIB and/or a corresponding SIB.

At block 908, the UE 210 may read at least a portion of a SIB on the broadcast channel of the cell of the second PLMN based on scheduling information provided in the MIB. In one example, the UE 210 may be reading the SIB when a page (as determined from the paging schedule) is scheduled to occur before reading of the SIB can be completed. The UE 210 may have partially-read a SIB which may be a SIB-1 or a SIB-3, for example.

At block 910, the UE 210 may determine whether a partially-read SIB includes information for identifying the second PLMN. Information that can identify the second PLMN may include a cell identifier and other PLMN-related information included in a SIB-1 and/or a SIB-3, for example. Information that can identify the second PLMN may include acquisition information such as a primary scrambling code, a secondary scrambling code, and PN position or offset.

If the UE 210 determines, at block 910, that the partially-read SIB does not include information for identifying the second PLMN then, at block 912, the UE 210 may decide to discontinue reading of the partially-read SIB when the partially-read SIB is scheduled for transmission at least partially concurrently with a first paging occasion of the one or more paging occasions.

In an aspect of the disclosure, when the UE 210 discontinues reading of the partially-read SIB, the UE 210 may store at least one of the MIB or the one or more SIBs received from the broadcast channel of the cell of the second PLMN. The UE 210 may receive the page from the serving cell based on the first paging occasion, and based on the storing in the storage medium. The UE 210 may retrieve the at least one of the MIB or the one or more SIBs after receiving the page. The UE 210 may read the partially-read SIB on the broadcast channel of the cell of the second PLMN after retrieving the at least one of the MIB or the one or more SIBs from the storage medium.

If at block 910, the UE 210 determines that the partially-read SIB includes information for identifying the second PLMN then, at block 914 the UE 210 may decide to ignore the first paging occasion when the partially-read SIB is scheduled for transmission at least partially concurrently with the first paging occasion.

Figure 10:
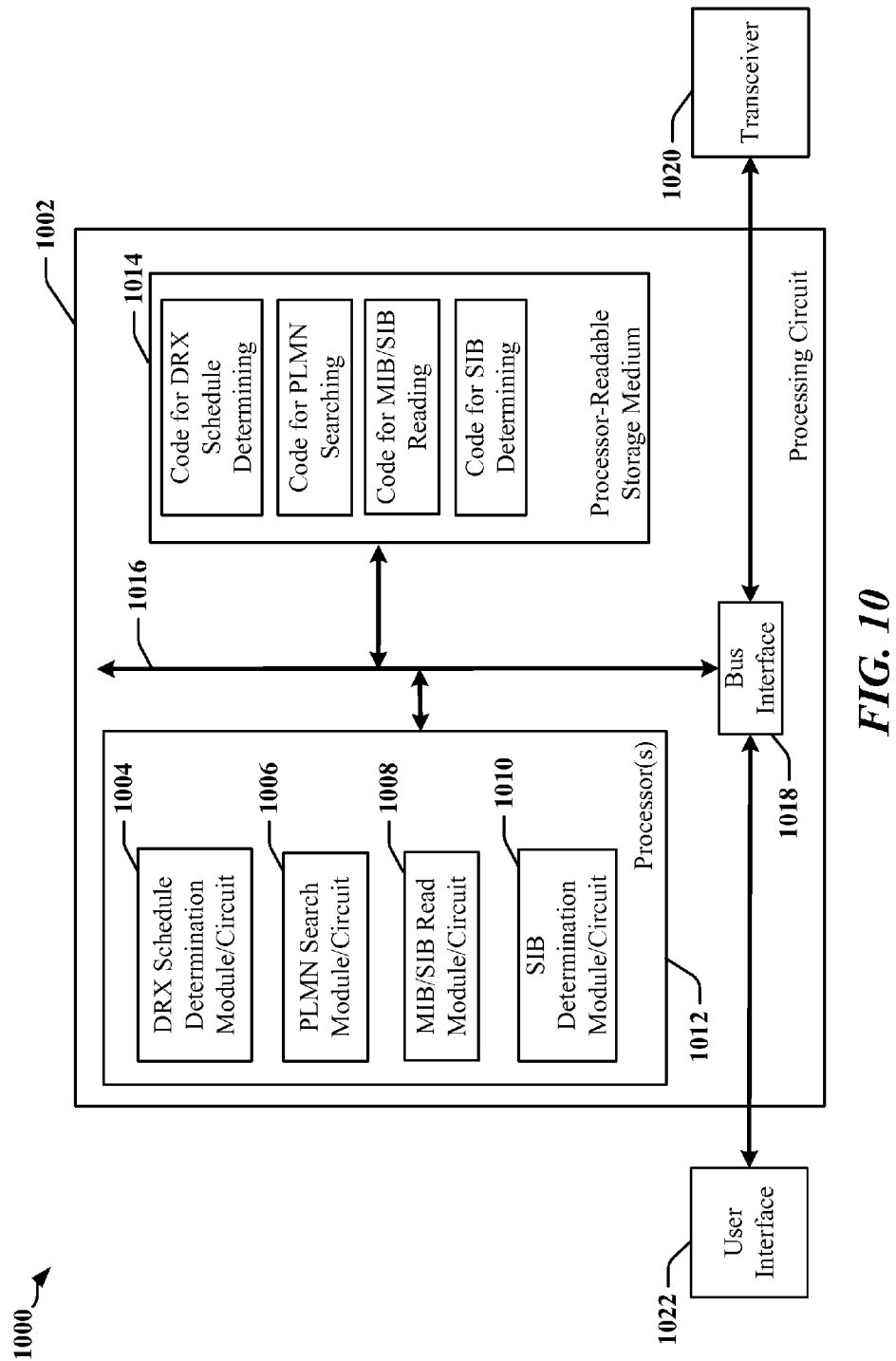
FIG. 10 is a diagram illustrating a first example of a hardware implementation for an apparatus employing a processing system configured to perform a PLMN search in accordance with certain aspects disclosed herein.

FIG. 10 is a diagram 1000 illustrating a simplified example of a hardware implementation for an apparatus employing a processing circuit 1002 and adapted for conducting a background PLMN search in accordance with certain aspects disclosed herein. The processing circuit 1002 may be provided in accordance with certain aspects illustrated in relation to the processing circuit 102 of FIG. 1. The processing circuit 1002 has one or more processors 1012 that may include a microprocessor, microcontroller, digital signal processor, a sequencer and/or a state machine. The processing circuit 1002 may be implemented with a bus architecture, represented generally by the bus 1016. The bus 1016 may include any number of interconnecting buses and bridges depending on the specific application of the processing circuit 1002 and the overall design constraints. The bus 1016 links together various circuits including a computer-readable storage medium 1014 and the one or more processors 1012 and/or hardware devices that cooperate to perform certain functions described herein, and which are represented by the modules and/or circuits 1004, 1006, 1008 and 1010. The bus 1016 may also link various other circuits such as timing sources, timers, peripherals, voltage regulators, and power management circuits. A bus interface 1018 may provide an interface between the bus 1016 and other devices such as a transceiver 1020 or a user interface 1022. The transceiver 1020 may provide a wireless communications link for communicating with various other apparatus. In some instances the transceiver 1020 and/or user interface 1022 may connect directly to the bus 1016.

The processor 1012 is responsible for general processing, including the execution of software stored as code on the computer-readable storage medium 1014. The software, when executed by the processor 1012, configures one or more components of the processing circuit 1002 such that the processing circuit 1002 may perform the various functions described supra for any particular apparatus. The computer-readable storage medium 1014 may also be used for storing data that is manipulated by the processor 1012 when executing software, including system information read from MIBs and SIBS received in a PCCH. The processing circuit 1002 further includes at least one of the modules 1004, 1006, 1008 and 1010. The modules 1004, 1006, 1008 and 1010 may be software modules running in the processor 1012 loaded from code resident and/or stored in the computer readable storage medium 1014, one or more hardware modules coupled to the processor 1012, or some combination thereof. The modules 1004, 1006, 1008 and/or 1010 may include microcontroller instructions, state machine configuration parameters, or some combination thereof.

In one configuration, the apparatus 1000 for wireless communication includes a module and/or circuit 1004 that is configured to determine a DRX schedule, including a paging schedule for a serving cell of a first PLMN, a module and/or circuit 1006 configured to initiate and conduct a PLMN search for a preferred PLMN between paging intervals, a module and/or circuit 1008 configured to read a MIB and one or more SIBs received on a broadcast channel of a cell corresponding to a second PLMN identified by the PLMN search, and a SIB determination module and/or circuit 1010 configured to determine whether a scheduled or partially-read SIB on the broadcast channel includes information for identifying the second PLMN. The processing circuit 1002 may be configured to decide whether to refrain from reading the scheduled SIB and/or discontinue reading of the partially-read SIB when the scheduled or partially-read SIB is scheduled for transmission concurrently with a page scheduled by the paging schedule. The page may be handled when the scheduled or partially-read SIB does not include information for identifying the second PLMN, the page may be ignored when the scheduled or partially-read SIB includes information for identifying the second PLMN. The aforementioned means may be implemented, for example, using some combination of one of the processors that are embedded in or that control operation of the UE 450.

The system information used by the UE 210 to identify a PLMN and to acquire a cell of the PLMN may be broadcast at regular intervals by the core network 204, through an RNC 206 and/or from a Node B 208. A UE 210 that has acquired a cell associated with the PLMN may continue to receive the system information until it has received sufficient information to facilitate or complete a PLMN search, to update its configuration, and for other reasons.

In accordance with certain aspects disclosed herein, a UE 210 that has acquired a first cell may selectively ignore certain transmissions of system information broadcast by a cell in order to perform other functions including, for example, acquisition of a second cell during a background PLMN search. As discussed herein, the UE 210 may conduct the background PLMN search for a HPLMN by scanning multiple frequencies to find a cell having characteristics matching the HPLMN corresponding to the UE 210. The UE 210 may read and examine system information in information blocks transmitted on the BCCH of each cell found during the PLMN search.

During a background PLMN search, the UE 210 may use only a few specific information blocks to identify a PLMN, and a UE 210 adapted according to certain aspects disclosed herein may improve a search for a HPLMN by performing other useful actions between receipt of these specific information blocks. In one example, a UE 210 that has acquired a first cell may perform a search and acquisition of a second cell on another frequency between transmissions of information blocks on the first cell. The UE 210 may also receive information blocks from the second cell if time permits before reacquisition of the first cell. The UE 210 may acquire the second cell if the scheduled broadcast of information blocks from the first cell allows sufficient time. A threshold time may be configured that will allow the UE 210 to change frequencies, acquire the second cell, and then return to the first frequency. In some instances, the UE 210 may read a MIB or SIB before returning to the first frequency.

Figure 11:
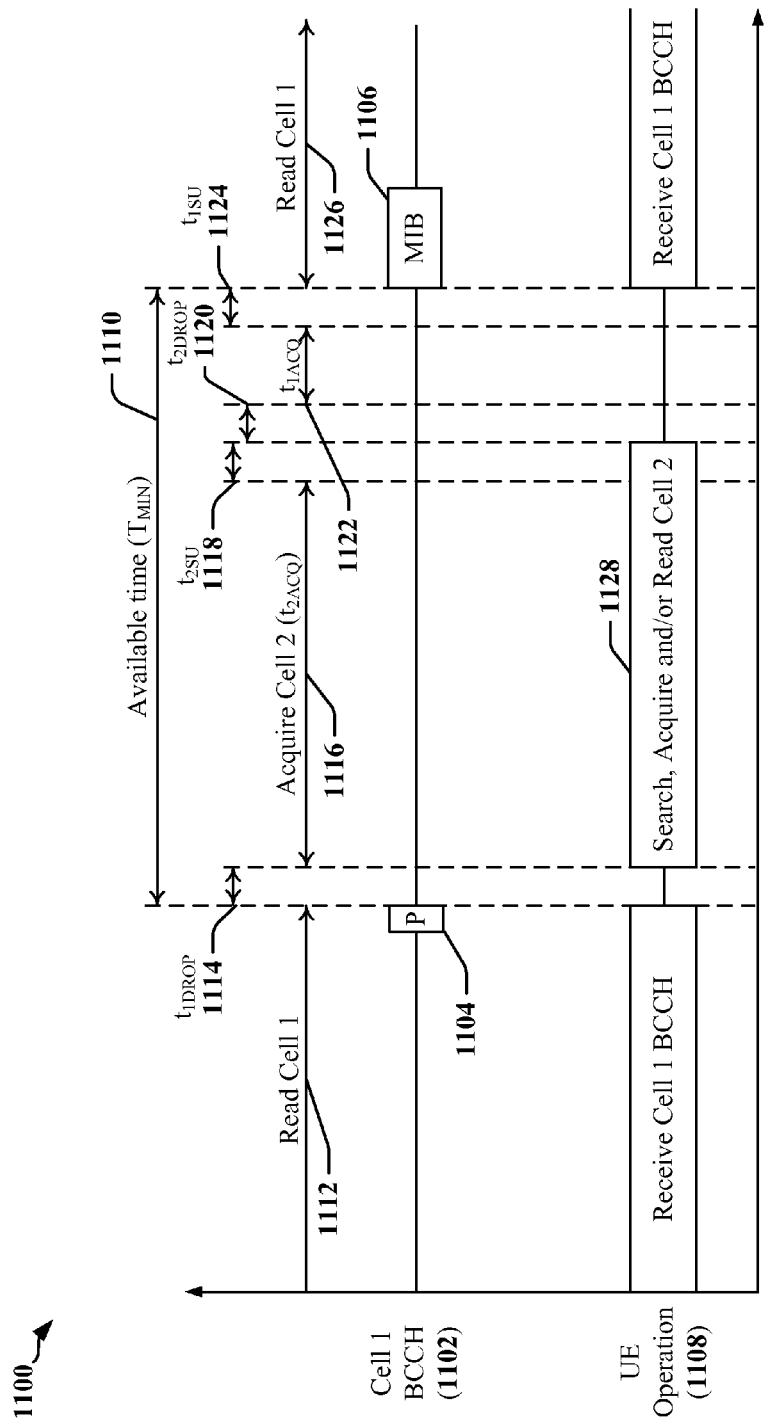
FIG. 11 is a timing diagram illustrating a PLMN search conducted in accordance with certain aspects disclosed herein.

FIG. 11 is a timing diagram 1100 illustrating an example in which a UE 210 may be adapted to acquire new cell, rather than wait for an information block on a current cell. In the example, the UE 210 may be reading one or more channels 1102 on a first cell when a PICH 1104 is received in a BCCH 1102 of the first cell. The UE 210 may be adapted according to certain aspects disclosed herein to determine the amount of time 1110 available before a MIB 1106 or PLMN-identifying SIB of the first cell is scheduled for transmission. A PLMN-identifying SIB may be a SIB that includes information used during a PLMN search to identify a PLMN. If the available time 1110 exceeds a threshold minimum time, the UE 210 may drop the BCCH 1102 of the first cell in order to acquire a second cell. In some instances, the available time 1110 may correspond to the time between transmission of a MIB and a SIB and/or between SIBs on the first cell. A threshold or minimum available time ($T_{MIN}$) may include a time interval ($t_{1DROP}$) 1114 to drop BCCH of the first cell, a time interval ($t_{2ACQ}$) 1116 to acquire a second cell, a time interval ($t_{2SU}$) 1118 to setup BCCH of the second cell, a time interval ($t_{2DROP}$) 1120 to drop the BCCH of the second cell, a time interval ($t_{1ACQ}$) 1122 to acquire the first cell and a time interval ($t_{1SU}$) 1124 to set up BCCH of the first cell. In one example, the minimum available time 1110 between PICH 1104 and a MIB 1106 or SIB, or between MIBs/SIBs may be calculated as:

$$T_{MIN} = t_{1DROP} + t_{2ACQ} + t_{2SU} + t_{2DROP} + t_{1ACQ} + t_{1SU}$$
$$= 15 \text{ ms} + 150 \text{ ms} + 15 \text{ ms} + 15 \text{ ms} + 30 \text{ ms} + 15 \text{ ms}$$
$$= 240 \text{ ms}.$$

In the latter example, the 150 millisecond time interval 1116 to acquire the second cell corresponds to a first acquisition of the second cell, while the 30 millisecond time interval 1122 to acquire the first cell corresponds to a reacquisition time.

Based on the latter example, if the available time 1110 between transmissions of a MIB and a PLMN-identifying SIB or between two PLMN-identifying SIBs of the first cell exceeds 250 milliseconds, then the BCCH 1102 of the first cell may be dropped in order to perform an acquisition or other operation 1128 in a background PLMN search. In some instances, a MIB or SIB may be read on the second cell within the available time 1110, provided the UE 210 can reacquire the first cell and set up the BCCH 1102 in time to receive a MIB or PLMN-identifying SIB from the first cell. After completing reading of the SIB on the first cell, the UE 210 may reacquire the second cell using acquisition information and other stored system information previously received in broadcasts on the second cell. The use of previously received acquisition information and/or previously read MIB and SIBs may reduce the time for reacquisition of the second cell. In one example, the time 1116 expended for a typical first acquisition attempt of a cell may be approximately 150 milliseconds. However, when the UE 210 is adapted to store acquisition information obtained during the first acquisition attempt, reacquisition times may be reduced significantly and, in some instances, reacquisition time 1122 may be less than 10 milliseconds. Thus, 140 milliseconds or more of the available 250 milliseconds 1110 between MIB/SIBs can be used for reading information on the second cell.

Figure 12:
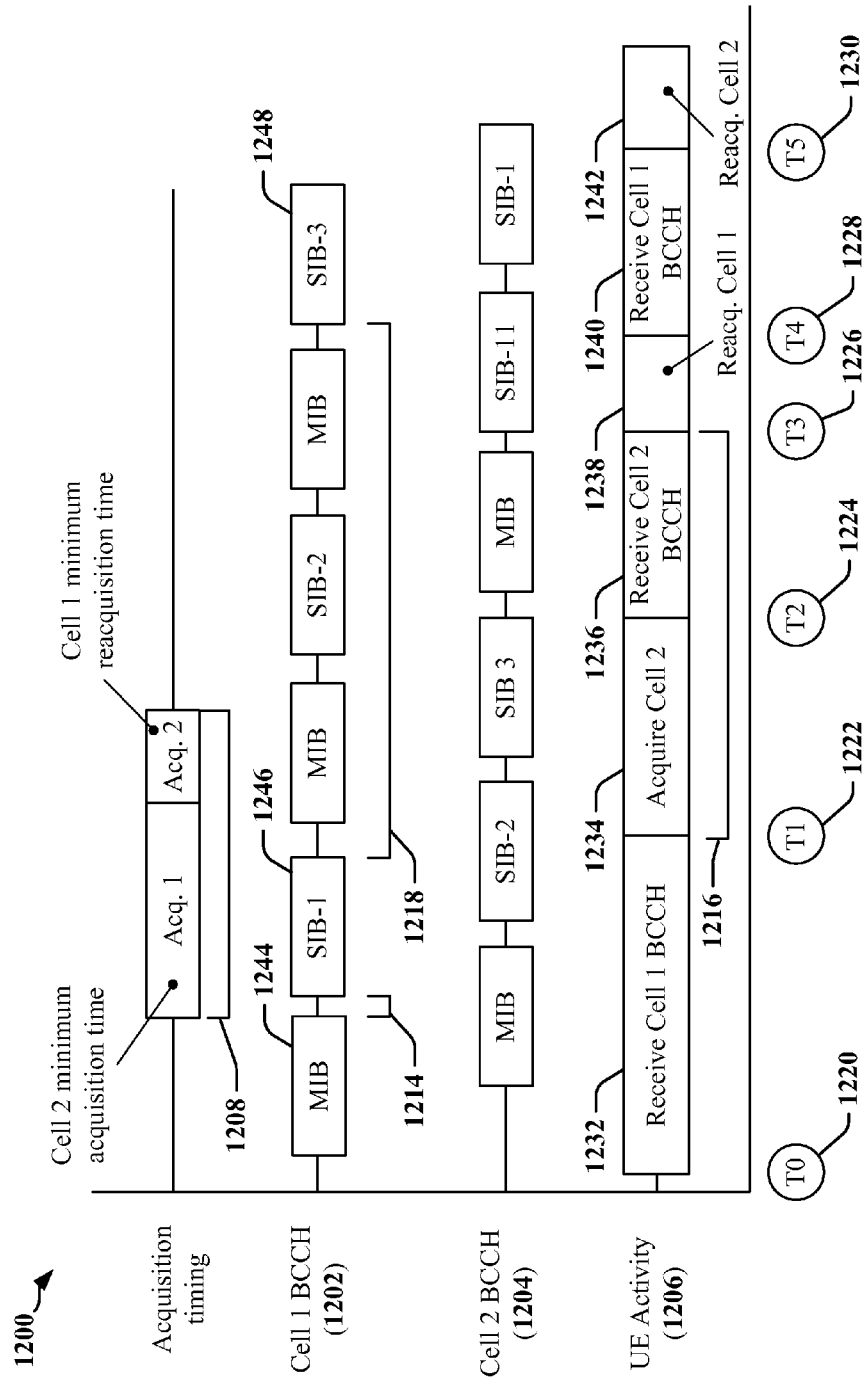
FIG. 12 is a timing diagram illustrating signals from two cells that are monitored in accordance with certain aspects disclosed herein.

FIG. 12 is a timing diagram 1200 illustrating an example in which a UE 210 monitors signals from two cells according to certain aspects disclosed herein. In the example, the UE 210 may monitor and/or read a first BCCH channel 1202, which may be broadcast by a first cell on a first frequency. The UE 210 may monitor and/or read a second BCCH channel 1204, which may be broadcast by a second cell on a second frequency. The UE 210 may include a processing circuit that performs certain functions in a time-sharing manner in support of UE activity 1206. In one example, the one or more processing circuits may include one or more of the processors 460, 470, 480, 482, 490, and 494 illustrated in the UE 450 illustrated in FIG. 4. The UE 210 may be configured and controlled to perform certain methods 1206 disclosed herein.

In the example, the UE 210 may be initially tuned to the first frequency, and may be monitoring or reading 1232 the first BCCH 1202. Commencing at a first point in time (T0) 1220, the UE 210 may receive a MIB 1244 and SIB-1 1246 on the first BCCH 1202. Upon receipt of the MIB 1244, the UE 210 may determine the transmission schedule for subsequent SIBs, including the SIB-1 1246 and a SIB-3 1248. In the example, the SIB-1 1246 is scheduled to be transmitted after an interval of time 1214 that is less than the minimum (threshold) time 1208 that would permit acquisition of a second BCCH 1204 of a second cell and reacquisition of the first BCCH 1202 before the SIB-1 is scheduled for transmission. Accordingly, the UE 210 may continue to receive the first BCCH 1202 in order to read the SIB-1 1246.

At a second point in time (T1) 1222, the SIB-1 1246 has been received and the UE 210 may determine that the next PLMN-identifying SIB is a SIB-3 1248, which is not scheduled to be transmitted on the cell until after a time interval 1218 that commences after the transmission of the SIB-1 1246 is complete. The UE 210 may determine that the time interval 1218 between the PLMN-identifying SIBs 1246, 1248 is greater than the threshold time 1208 and may elect to resume a PLMN search and/or acquire a second cell during the intervening time interval 1218. As discussed above, the threshold time 1208 may be based on the time used to acquire a second cell and reacquire the first cell. The UE 210 may set a timer to expire after a time interval 1216. The time interval 1216 associated with the timer may be determined based on the available time 1218 between SIBs and/or the time to perform a reacquisition 1238 of the first cell. The time interval 1216 associated with the timer may have a value that corresponds to, or exceeds the threshold time 1208. The timer may be used to indicate when the UE 210 should drop the second cell and reacquire the first cell in order to read the SIB-3 1248 on the first BCCH 1202. The UE 210 may acquire the second cell and read or monitor the second BCCH 1204 before the timer expires. The time used to acquire the second cell and read the second BCCH 1204 may be significant if the UE 210 has not previously stored acquisition and/or other system information regarding the second cell.

At a third point in time (T2) 1224, the UE 210 may receive 1236 the second BCCH 1204 after acquisition 1234 of the second cell is completed. Typically, the UE 210 attempts to receive a MIB transmitted on the second BCCH 1204.

At a fourth point in time (T3) 1226, the timer set by the UE 210 at time T1 1222 may expire, and the UE 210 may perform a reacquisition 1238 of the first cell. The time to reacquire the first cell and begin receiving the first BCCH 1202 may be significantly shorter than the time to acquire the second cell because the UE 210 may have stored acquisition information and other system information for the first cell, whereas the acquisition of the second cell may be a first acquisition of the second cell. After an acquisition of the second cell, acquisition information and system information for the second cell may be stored by the UE 210 to permit more rapid subsequent acquisitions of the second cell, thereby enabling a shortening of the threshold time 1208.

At a fifth point in time (T4) 1228, the UE 210 may begin reception 1240 of the first BCCH 1202 in time to read the SIB-3 1248. Upon reading the SIB-3, the UE 210 may have received a MIB 1244, SIB-1 1246, and SIB-3 1248 from the first BCCH 1202. The availability of the system information for the first cell found in the MIB 1244, SIB-1 1246, and SIB-3 1248 may be sufficient for the purposes of a PLMN search.

At a sixth point in time (T5) 1230, the UE 210 may reacquire 1242 the second cell in order to receive the second BCCH 1204 and complete the system information for the second cell used for the PLMN search of the frequency associated with the second cell.

Figure 13:
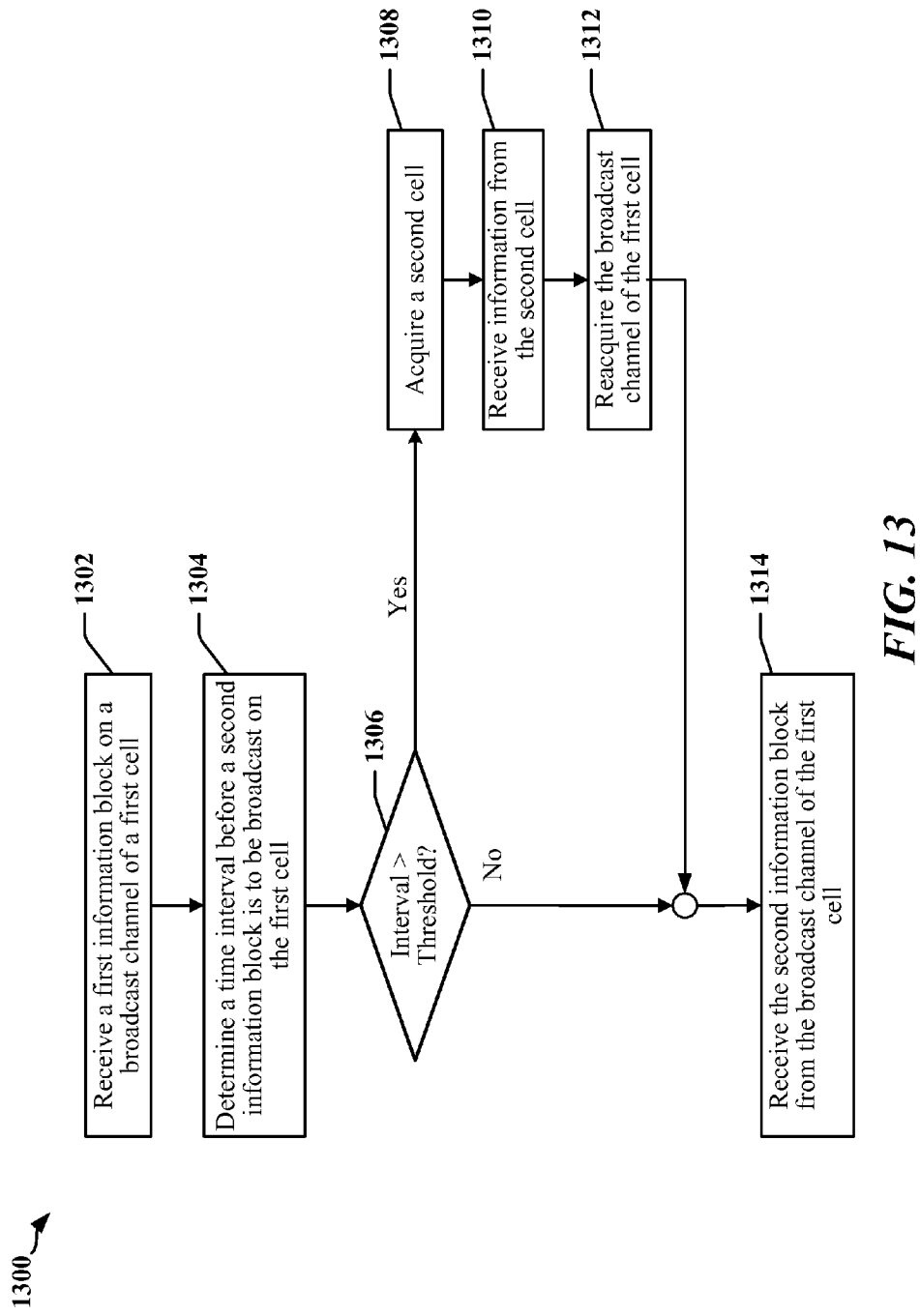
FIG. 13 is a flow chart illustrating another example of a PLMN search according to certain aspects disclosed herein.

FIG. 13 is a flowchart illustrating a method 1300 of wireless communication. The method may be operable at a UE 210, which may correspond to the UE 450 of FIG. 4. While, for purposes of simplicity of explanation, the method is shown and described as a series of acts, it is to be understood and appreciated that the method, and further methods related thereto may not be limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

The method 1300 may be performed while conducting a PLMN search, which may be, for example, a background PLMN search initiated and/or conducted while a UE 210 is roaming or out-of-service. The PLMN search may use various algorithms for determining which frequencies to scan. In an aspect, the UE 210 may first scan frequencies included in an acquisition database of known cells. If no HPLMN cell is located, the UE 210 may perform a full band scan until a cell is identified. Various algorithms may be used to determine the order of frequencies scanned. The UE 210 may generate a list of frequencies where sufficient signal strength indicates the presence of a cell, and then attempt to acquisition cells for such frequencies in order. During acquisition, a UE 210 may tune to a frequency and determine acquisition information such as a primary scrambling code, secondary scrambling code, and PN position or offset. The UE 210 may then be able to receive the BCCH of the cell. The broadcast channel may include a system information message including a MIB and a number of SIBs. The MIB and SIBs may include information such as a cell identifier and PLMN information that the UE 210 may use to determine whether the cell corresponds to a HPLMN.

In an aspect, a first information block on a broadcast channel of a first cell associated with the UE 210 may be received at block 1302. The UE 210 may receive the first information block on the BCCH channel of the first cell. The first information block may be a MIB that defines scheduling information for other information blocks. In an aspect, a MIB may have a relatively fast periodicity or repetition. For example, the MIB may have a periodicity of 40 ms or 80 ms. In another aspect, the scheduling information for other information blocks may be included in another information block such as a SIB-1.

At block 1304, the UE 210 may determine whether a time interval before a second information block is to be broadcast on the first cell exceeds a threshold period of time. In one example, the UE 210 may calculate a time interval that may commence at, or near to, the completion of the broadcast of the first information block. The time interval may terminate at, or before the start of the broadcast of a second information block. The time interval may be determined based on scheduling information found in the first information block. The second information block may be the next block to be received that includes information relevant to a PLMN search. For example, the second information block may be a SIB-1 that includes a cell ID, or a SIB-3 that includes PLMN information. The periodicity of the second information block may be greater than the periodicity of the first information block. For example, the periodicity of a SIB-1 may be approximately 320 ms and the periodicity of a SIB-3 may be approximately 640 ms. It may be appreciated that the periodicity of a SIB may be configurable by a network operator and indicated by the scheduling information. The UE 210 may initiate a timer to expire before the second information block is to be broadcast.

At block 1306, the UE 210 may determine whether the time interval exceeds a threshold time. The threshold time may be a configurable length of time. The threshold time may be based on an amount of time used to acquire the second cell as described in greater detail above. The threshold time may include a period of time that includes a length of time calculated as a sum of a first acquisition time and a second acquisition time. The first acquisition time may correspond to a time used to reacquire the first cell. The second acquisition time may correspond to a time used to acquire the second cell. The time used to acquire the second cell may be a time used to reacquire the second cell. In one example, the threshold time may include a length of time that includes the time to drop a first BCCH on a current cell, tune to a new frequency, acquire a new cell on the new frequency, drop the BCCH of the new cell, tune to the first frequency, and reacquire the first BCCH. In an aspect, the threshold may be approximately 250 ms. If the time until the broadcast of the second block is greater than the threshold time, the UE 210 may proceed to block 1308. If the time until the broadcast of the second block is less than or equal to the threshold time, the UE 210 may continue at block 1314. In some instances, the time to acquire the second cell may be calculated based on the time to reacquire the second cell using stored acquisition information.

In block 1314, the UE 210 may read or otherwise receive the second information block from the broadcast channel of the first cell. The second information block may be received after determining at block 1306 whether the time interval exceeds a threshold time. The UE 210 may wait for the scheduled broadcast time of the second information block. The second information block may be expected in less time than the threshold time. Accordingly, the UE 210 may monitor the BCCH channel of the first cell while waiting for the second information block.

When the time interval is determined at block 1306 to exceed the threshold period of time, then at block 1308 the UE 210 may acquire, or attempt to acquire, a second cell before the second information block is broadcast on the first cell. The second cell may use the next frequency designated to be searched. For example, the second cell may use the next frequency included in an acquisition database listing cells previously acquired or may be the next frequency in a full band scan. If the UE 210 is unable to acquire any cell at the selected frequency, the UE 210 may return to block 1304 to determine whether there is time to attempt a search at another frequency. Alternatively, the UE 210 may attempt to acquire another cell, unless or until the acquisition attempt is interrupted by expiration of the timer initiated in block 1304.

If the UE 210 successfully acquires a second cell, the UE 210 may store system information corresponding to the second cell after acquiring the second cell, where the system information includes acquisition information of the second cell. The acquisition information may include a primary scrambling code, secondary scrambling code, and PN position. The stored acquisition information may be used for more quickly reacquiring the second cell. For example, a first acquisition of a cell may involve approximately 150 ms whereas reacquiring a cell using stored acquisition information may involve only approximately 5 ms. Using stored acquisition information may reduce the total time for a PLMN search In block 1310, the UE 210 may receive one or more information blocks from the second cell. Information blocks may be received from the second cell when there is sufficient time before the second information block is scheduled for transmission on the first cell. The information blocks received from the second cell may include, for example, a MIB, a SIB-1 and/or a SIB-3. Receiving one or more information blocks before the second information block is transmitted on the first cell may reduce the total time for a PLMN search.

At block 1312, the UE 210 may reacquire the broadcast channel of the first cell before the second information block is broadcast on the first cell based on the acquiring the second cell. In one example, the UE 210 may reacquire the first cell when indicated by the timer initiated in block 1304. In some instances, the UE 210 may reacquire the broadcast channel of the first cell when the timer expires. The UE 210 may reacquire the broadcast channel of the first cell using previously-obtained acquisition information for the first cell. The UE 210 may use previously-obtained acquisition information for the first cell to quickly reacquire the first cell before the second information block arrives.

At block 1314, the UE 210 may receive the second information block on the BCCH of the first cell. Once the second information block is received, the UE 210 may continue with the PLMN search. The UE 210 may repeat various blocks of the method 1300 as necessary to efficiently receive information blocks. For example, the UE 210 may return to block 1304 to determine whether a third information block for the first cell will arrive within a threshold time period. As another example, the UE 210 may return to block 1310 to receive an information block from the second cell. The UE 210 may store scheduling information for multiple cells in order to determine which cell will provide the next receivable information block. In some instances, the second information block includes information for identifying a PLMN associated with the first cell.

In some examples, the UE 210 may reacquire the second cell using the stored acquisition information of the second cell after receiving the second information block from the broadcast channel of the first cell.

The method 1300 provides a PLMN search that may be faster than alternative methods. By acquiring a new cell during a period where the UE 210 would otherwise be waiting to receive on the BCCH channel, the UE 210 may reduce the total search time. The reduction in search time may allow the UE 210 to more quickly return to a sleep state where less power is consumed. For example, a UE 210 may consume approximately 0.518 mW when the BCCH channel is up. Accordingly, if a single acquisition of a second cell during the waiting period saves 250 ms, the energy savings may be approximately 129.5 millijoules. Therefore, the method 1300 may result in appreciable energy savings when a UE 210 is roaming or out-of-service.

Figure 14:
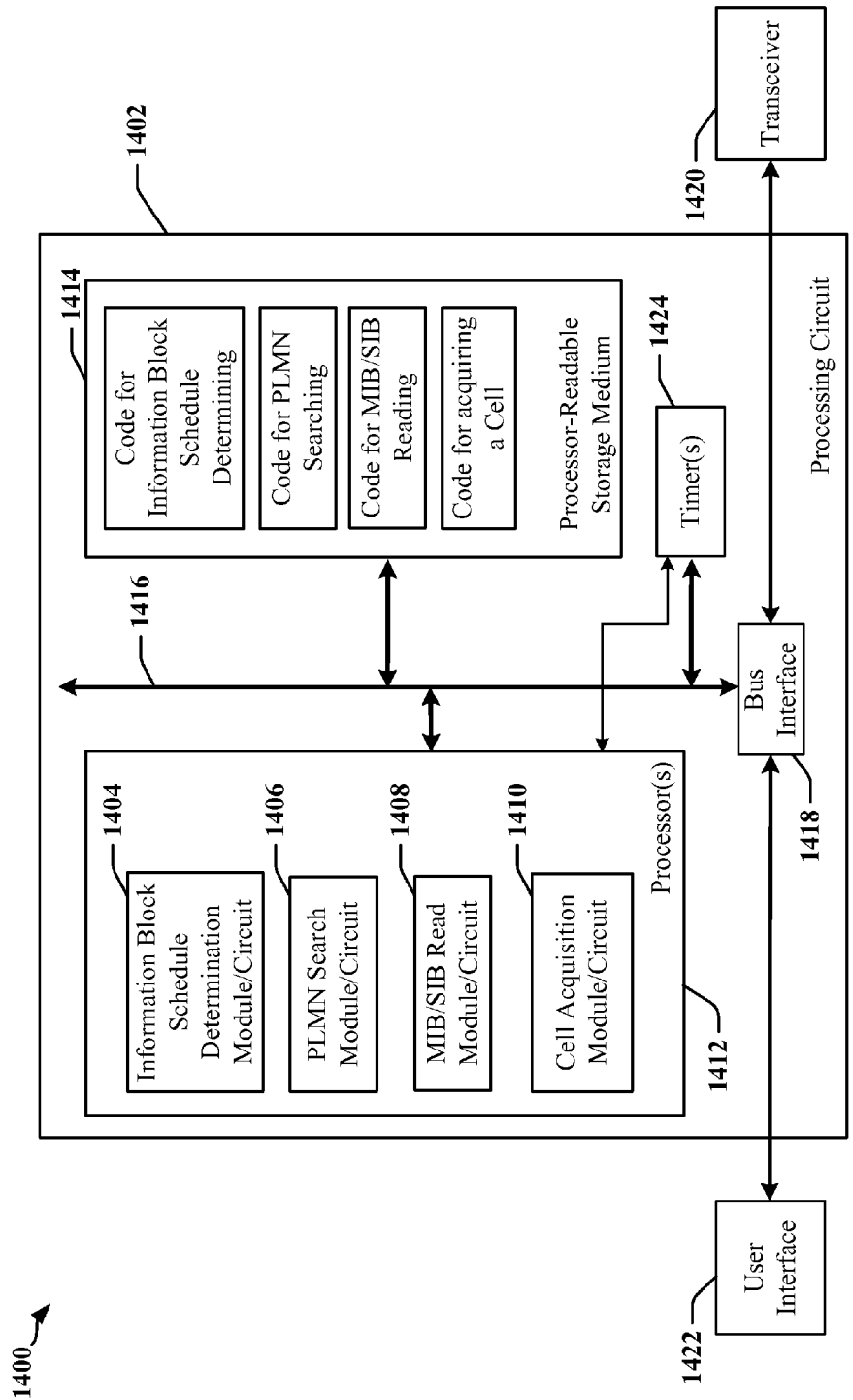
FIG. 14 is a diagram illustrating a second example of a hardware implementation for an apparatus employing a processing system configured to perform a PLMN search in accordance with certain aspects disclosed herein.

FIG. 14 is a conceptual diagram illustrating an example of a hardware implementation for an apparatus 1400 employing a processing circuit 1402. In this example, the processing circuit 1402 may be implemented with a bus architecture, represented generally by the bus 1416. The bus 1416 may include any number of interconnecting buses and bridges depending on the specific application of the processing circuit 1402 and the overall design constraints. The bus 1416 links together various circuits including one or more processors, represented generally by the processor 1412, and computer-readable media, represented generally by the processor-readable storage medium 1414. One or more timers 1424 may be connected to the bus and/or may be directly accessible or embodied in a processor 1412. The bus 1416 may also link various other circuits such as timing sources, timers, peripherals, voltage regulators, and power management circuits. A bus interface 1418 provides an interface between the bus 1416 and a transceiver 1420. The transceiver 1420 provides a means for communicating with various other apparatus over a transmission medium. Depending upon the nature of the apparatus, a user interface 1422 (e.g., keypad, display, speaker, microphone, joystick) may also be provided.

The processor 1412 is responsible for managing the bus 1416 and general processing, including the execution of software stored on the processor-readable storage medium 1414. The software, when executed by the processor 1412, causes the processing circuit 1402 to perform the various functions described supra for any particular apparatus. The processor-readable storage medium 1414 may be used for storing data that is manipulated by the processor 1412 when executing software. The processor-readable storage medium 1414 may also be used for storing system information related to one or more PLMNs, RANs, and the apparatus 1400. For example, the processor-readable storage medium 1414 may maintain acquisition information for one or more cells of a wireless network. In one example, the acquisition information may be used for acquiring and reacquiring cells during a PLMN search.

In one configuration the processing circuit may include a scheduling module or circuit 1404 for determining a schedule of information block transmissions and for determining whether a time interval before a second information block is broadcast on the first cell exceeds a threshold period of time, a PLMN search module or circuit 1406 for initiating and conducting a PLMN search when the time interval exceeds the threshold period of time, a module or circuit 1408 for receiving information blocks on broadcast channels one or more cells, and a module or circuit 1410 for acquiring cells. Each of the modules or circuits may be implemented in hardware, in software loaded from code stored on the processor-readable storage medium 1414, or in a combination of hardware and the software.

The PLMN search module or circuit 1406 may be responsible for searching for a particular PLMN such as a home PLMN associated with the apparatus 1400. The PLMN search module or circuit 1406 may include or employ one or more timers 1424 that cooperate with, or are embedded in a processor 1412. In one example, the one or more timers 1424 may include logic circuits, such as combinational logic and counters that respond to a timing source, and that provide an interrupt, message or other event notification when the timer expires. In another example, the one or more timers 1424 may be provided as a service in a multi-tasking system that provides an interrupt, message or other event notification when the one or more timers expire.

Several aspects of a telecommunications system have been presented with reference to examples that relate to a UMTS and/or W-CDMA system. As those skilled in the art will readily appreciate, various aspects described throughout this disclosure may be extended to other telecommunication systems, network architectures and communication standards.

By way of example, various aspects may be extended to other UMTS implementations such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing LTE (in FDD, TDD, or both modes), LTE-Advanced (LTE-A) (in FDD, TDD, or both modes), CDMA2000, EV-DO, Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method of conducting a public land mobile network (PLMN) search, comprising:
    determining a paging schedule for a serving cell of a user equipment, the serving cell being associated with a first PLMN, wherein the paging schedule defines one or more paging occasions;
    initiating a search for a second PLMN between consecutive paging occasions;
    reading a master information block (MIB) on a broadcast channel of a cell of the second PLMN;
    reading, by the user equipment, at least a portion of a system information block (SIB) on the broadcast chan- nel of the cell of the second PLMN based on scheduling information provided in the MIB;

discontinuing reading of a partially-read SIB when the partially-read SIB is scheduled for transmission at least partially concurrently with a first paging occasion of the one or more paging occasions and the partially-read SIB does not comprise information for identifying the second PLMN; and ignoring the first paging occasion when the partially-read SIB is scheduled for transmission at least partially concurrently with the first paging occasion and the partially-read SIB comprises the information for identifying the second PLMN.

2. The method of claim 1, wherein the first PLMN is a visited PLMN, and wherein determining the paging schedule comprises receiving system information while the user equipment is camped on the serving cell.

3. The method of claim 2, wherein the search for the second PLMN is initiated to find a home PLMN.

4. The method of claim 1, wherein the partially-read SIB comprises a SIB-1 or a SIB-3.

5. The method of claim 1, wherein discontinuing reading of the partially-read SIB comprises:

storing in a storage medium at least one of the MIB or one or more SIBs received from the broadcast channel of the cell of the second PLMN; and receiving a page from the serving cell based on the first paging occasion and on the storing in the storage medium.

6. The method of claim 5, further comprising:

retrieving the at least one of the MIB or the one or more SIBs from the storage medium after receiving the page; and reading the partially-read SIB on the broadcast channel of the cell of the second PLMN after retrieving the at least one of the MIB or the one or more SIBs from the storage medium.

7. The method of claim 1, and further comprising:

storing in a storage medium the MIB received from the broadcast channel of the cell of the second PLMN when reading of the partially-read SIB is discontinued;

receiving a page from the serving cell based on the first paging occasion and on the storing in the storage medium;

retrieving the MIB from the storage medium after receiving the page; and reading the partially-read SIB on the broadcast channel of the cell of the second PLMN after retrieving the MIB.

8. The method of claim 1, wherein the information for identifying the second PLMN comprises one or more of a mobile country code, a mobile network code, or information identifying a service provider associated with the second PLMN.

9. A user equipment configured for wireless communication, comprising:

at least one processor;

a memory coupled to the at least one processor; and a wireless communication interface coupled to the at least one processor, wherein the at least one processor is configured to:

determine a paging schedule for a serving cell of the user equipment, the serving cell being associated with a first PLMN, wherein the paging schedule defines one or more paging occasions;

initiate a search for a second PLMN between consecutive paging occasions;

read a master information block (MIB) on a broadcast channel of a cell of the second PLMN;

read at least a portion of a system information block (SIB) on the broadcast channel of the cell of the second PLMN based on scheduling information provided in the MIB;

discontinue reading of a partially-read SIB when the partially-read SIB is scheduled for transmission at least partially concurrently with a first paging occasion of the one or more paging occasions and the partially-read SIB does not comprise information for identifying the second PLMN; and ignore the first paging occasion when the partially-read SIB is scheduled for transmission at least partially concurrently with the paging occasion and the partially-read SIB comprises the information for identifying the second PLMN.

10. The user equipment of claim 9, wherein the first PLMN is a visited PLMN, and wherein the search for the second PLMN is initiated to find a home PLMN associated with the user equipment.

11. The user equipment of claim 9, wherein the information for identifying the second PLMN includes information provided in a SIB-1 or a SIB-3.

12. The user equipment of claim 9, wherein the at least one processor is configured to:

store at least one of the MIB or one or more SIBs in the memory before discontinuing reading of the partially-read SIB when the partially-read SIB is scheduled for transmission at least partially concurrently with the paging occasion; and receive a page from the serving cell after storing the at least one of the MIB or one or more SIBs in the memory.

13. The user equipment of claim 12, the at least one processor is configured to:

retrieve the at least one of the MIB or one or more SIBs from the memory after receiving the page; and read the partially-read SIB on the broadcast channel of the cell corresponding to the second PLMN after retrieving the at least one of the MIB or one or more SIBs.

14. The user equipment of claim 9, wherein the at least one processor is configured to:

store in a storage medium the MIB received from the broadcast channel of the cell of the second PLMN when reading of the partially-read SIB is discontinued;

receive a page from the serving cell based on the first paging occasion and on the storing in the storage medium;

retrieve the MIB from the storage medium after receiving the page; and read the partially-read SIB on the broadcast channel of the cell of the second PLMN after retrieving the MIB.

15. The user equipment of claim 9, wherein the information for identifying the second PLMN comprises one or more of a mobile country code, a mobile network code, or information identifying a service provider associated with the second PLMN.

16. An apparatus comprising a user equipment configured for wireless communication, wherein the user equipment comprises:

means for determining a paging schedule for a serving cell of the user equipment, the serving cell being associated with a first PLMN, wherein the paging schedule defines one or more paging occasions;

means for initiating a search for a second PLMN between consecutive paging occasions;

means for reading a master information block (MIB) on a broadcast channel of a cell of the second PLMN and for reading at least one system information block (SIB) on the broadcast channel of the cell of the second PLMN based on scheduling information provided in the MIB;

means for identifying whether a partially-read SIB comprises information for identifying the second PLMN; and means for determining whether to discontinue reading of a partially-read SIB in order to receive a page, wherein reading of the partially-read SIB is discontinued when the partially-read SIB is scheduled for transmission at least partially concurrently with a first paging occasion of the one or more paging occasions and the partially-read SIB does not comprise the information for identifying the second PLMN, and the first paging occasion is ignored when the partially-read SIB is scheduled for transmission at least partially concurrently with the paging occasion and the partially-read SIB comprises the information for identifying the second PLMN.

17. The apparatus of claim 16, wherein the first PLMN is a visited PLMN, and wherein the search for the second PLMN is initiated to find a home PLMN associated with the user equipment.

18. The apparatus of claim 16, wherein the information for identifying the second PLMN includes information provided in a SIB-1 or a SIB-3.

19. The apparatus of claim 16, further comprising:
means for storing at least one of the MIB or one or more SIBs in a memory of the apparatus before discontinuing reading of the partially-read SIB when the partially-read SIB is scheduled for transmission at least partially concurrently with the paging occasion, wherein a page is received from the serving cell after storing the at least one of the MIB or one or more SIBs in the memory.

20. The apparatus of claim 19, further comprising:
means for retrieving the at least one of the MIB or one or more SIBs from the memory after receiving the page, wherein the partially-read SIB is read on the broadcast channel of the cell corresponding to the second PLMN after retrieving the at least one of the MIB or one or more SIBs.

21. The apparatus of claim 16, further comprising:
means for storing in a storage medium the MIB received from the broadcast channel of the cell of the second PLMN when reading of the partially-read SIB is discontinued, wherein a page is received from the serving cell based on the first paging occasion and on the storing in the storage medium; and
means for retrieving the MIB from the storage medium after receiving the page, wherein the partially-read SIB is read on the broadcast channel of the cell of the second PLMN after retrieving the MIB.

22. The apparatus of claim 16, wherein the information for identifying the second PLMN comprises one or more of a mobile country code, a mobile network code, or information identifying a service provider associated with the second PLMN.

23. A non-transitory computer-readable storage medium comprising code for:
determining a paging schedule for a serving cell of a user equipment, the serving cell being associated with a first PLMN, wherein the paging schedule defines one or more paging occasions;

initiating a search for a second PLMN between consecutive paging occasions;

reading a master information block (MIB) on a broadcast channel of a cell of the second PLMN;

reading, by the user equipment, at least a portion of a system information block (SIB) on the broadcast channel of the cell of the second PLMN based on scheduling information provided in the MIB;

discontinuing reading of a partially-read SIB when the partially-read SIB is scheduled for transmission at least partially concurrently with a first paging occasion of the one or more paging occasions and the partially-read SIB does not comprise information for identifying the second PLMN; and ignoring the first paging occasion when the partially-read SIB is scheduled for transmission at least partially concurrently with the first paging occasion and the partially-read SIB comprises the information for identifying the second PLMN.

24. The storage medium of claim 23, wherein the first PLMN is a visited PLMN, and wherein determining the paging schedule comprises receiving system information while the user equipment is camped on the serving cell.

25. The storage medium of claim 24, wherein the search for the second PLMN is initiated to find a home PLMN.

26. The storage medium of claim 23, wherein the partially-read SIB comprises a SIB-1 or a SIB-3.

27. The storage medium of claim 23, wherein discontinuing reading of the partially-read SIB comprises:
storing in a storage medium at least one of the MIB or one or more SIBs received from the broadcast channel of the cell of the second PLMN; and
receiving a page from the serving cell based on the first paging occasion and on the storing in the storage medium.

28. The storage medium of claim 23, further comprising code for:
retrieving the at least one of the MIB or the one or more SIBs from the storage medium after receiving the page; and
reading the partially-read SIB on the broadcast channel of the cell of the second PLMN after retrieving the at least one of the MIB or the one or more SIBs from the storage medium.

29. The storage medium of claim 23, and further comprising code for:
storing in a storage medium the MIB received from the broadcast channel of the cell of the second PLMN when reading of the partially-read SIB is discontinued;
receiving a page from the serving cell based on the first paging occasion and on the storing in the storage medium;
retrieving the MIB from the storage medium after receiving the page; and
reading the partially-read SIB on the broadcast channel of the cell of the second PLMN after retrieving the MIB.

30. The storage medium of claim 23, wherein the information for identifying the second PLMN comprises one or more of a mobile country code, a mobile network code, or information identifying a service provider associated with the second PLMN.

* * * * *